US008149126B2

(12) United States Patent
Little et al.

(10) Patent No.: US 8,149,126 B2
(45) Date of Patent: Apr. 3, 2012

(54) LIFT MONITORING SYSTEM AND METHOD

(75) Inventors: Thomas DC Little, Newton, MA (US); Robert Cornelis Wagenaar, Wellesley, MA (US); John J. Anthony, III, Norwich, CT (US); Michael J. Gingrave, Wethersfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 589 days.

(21) Appl. No.: 12/362,737

(22) Filed: Jan. 30, 2009

(65) Prior Publication Data
US 2009/0135009 A1 May 28, 2009

Related U.S. Application Data

(63) Continuation-in-part of application No. 12/024,676, filed on Feb. 1, 2008.

(60) Provisional application No. 60/899,076, filed on Feb. 2, 2007.

(51) Int. Cl.
*G08B 23/00* (2006.01)
(52) U.S. Cl. .................... 340/573.7; 340/573.1; 340/540
(58) Field of Classification Search .................... 340/540
See application file for complete search history.

(56) References Cited

U.S. PATENT DOCUMENTS

| 4,665,388 A | * | 5/1987 | Ivie et al. | 340/573.1 |
|---|---|---|---|---|
| 4,831,526 A | | 5/1989 | Luchs et al. | |
| 4,938,476 A | * | 7/1990 | Brunelle et al. | 482/148 |
| 4,993,428 A | | 2/1991 | Arms | |
| 5,497,147 A | | 3/1996 | Arms et al. | |
| 5,570,301 A | * | 10/1996 | Barrus | 702/150 |
| 5,777,467 A | | 7/1998 | Arms et al. | |
| 5,825,283 A | | 10/1998 | Camhi | |
| 5,887,351 A | | 3/1999 | Arms et al. | |
| 6,433,629 B2 | | 8/2002 | Hamel et al. | |
| 6,499,368 B2 | | 12/2002 | Arms et al. | |
| 6,529,127 B2 | | 3/2003 | Townsend et al. | |
| 6,588,282 B2 | | 7/2003 | Arms | |
| 6,589,055 B2 | | 7/2003 | Osborne et al. | |
| 6,622,567 B1 | | 9/2003 | Hamel et al. | |
| 6,714,763 B2 | | 3/2004 | Hamel et al. | |
| 6,828,779 B2 | | 12/2004 | Townsend et al. | |
| 6,834,436 B2 | | 12/2004 | Townsend et al. | |
| 6,871,413 B1 | | 3/2005 | Arms et al. | |
| 6,901,654 B2 | | 6/2005 | Arms et al. | |

(Continued)

OTHER PUBLICATIONS

"PCT International Search Report of the International Searching Authority", mailed May 6, 2009 for PCT/US08/01435, 3pgs.

*Primary Examiner* — George Bugg
*Assistant Examiner* — Kerri McNally
(74) *Attorney, Agent, or Firm* — Buckley, Maschoff & Talwalkar

(57) ABSTRACT

Systems and methods are discussed for providing a sensor enhanced employee safety evaluation system. Systems that monitor and assess employee lifting behavior are employed at the workplace of an insured entity. Data from the lift monitoring systems are processed to obtain a safety evaluation. Based on the safety evaluation, the insurance provider can adjust the terms of the insurance policy to accurately reflect the risks associated with the insured entity. Feedback based on the safety evaluation is also provided to the insured entity and the employees of the insured entity to promote improvements in safe behavior.

85 Claims, 9 Drawing Sheets

U.S. PATENT DOCUMENTS

| | | |
|---|---|---|
| 7,061,229 B2 | 6/2006 | Townsend et al. |
| 7,081,693 B2 | 7/2006 | Hamel et al. |
| 7,143,004 B2 | 11/2006 | Townsend et al. |
| 7,170,201 B2 | 1/2007 | Hamel et al. |
| 7,210,240 B2 | 5/2007 | Townsend et al. |
| 7,256,505 B2 | 8/2007 | Arms et al. |
| 7,256,695 B2 | 8/2007 | Hamel et al. |
| 7,361,998 B2 | 4/2008 | Hamel et al. |
| 7,429,805 B2 | 9/2008 | Hamel et al. |
| 7,433,798 B2 | 10/2008 | Townsend et al. |
| 7,461,560 B2 | 12/2008 | Arms et al. |
| 7,591,187 B2 | 9/2009 | Hamel |
| 7,639,135 B2 | 12/2009 | Arms et al. |
| 7,646,135 B1 | 1/2010 | Churchill et al. |
| 7,652,582 B2 * | 1/2010 | Littell ........................ 340/573.7 |
| 7,668,667 B2 | 2/2010 | Robb et al. |
| 7,672,781 B2 | 3/2010 | Churchill et al. |
| 7,692,365 B2 | 4/2010 | Churchill et al. |
| 7,696,621 B2 | 4/2010 | Arms et al. |
| 7,698,830 B2 | 4/2010 | Townsend et al. |
| 7,719,416 B2 | 5/2010 | Arms et al. |
| 7,747,415 B1 | 6/2010 | Churchill et al. |
| 2004/0230138 A1 * | 11/2004 | Inoue et al. .................... 600/595 |
| 2005/0093537 A1 | 5/2005 | Townsend et al. |
| 2005/0105231 A1 | 5/2005 | Hamel et al. |
| 2005/0116544 A1 | 6/2005 | Hamel et al. |
| 2005/0116545 A1 | 6/2005 | Hamel et al. |
| 2005/0140212 A1 | 6/2005 | Hamel et al. |
| 2005/0146220 A1 | 7/2005 | Hamel et al. |
| 2006/0103534 A1 | 5/2006 | Arms et al. |
| 2007/0169364 A1 | 7/2007 | Townsend et al. |
| 2007/0285248 A1 | 12/2007 | Hamel et al. |
| 2009/0322557 A1 | 12/2009 | Robb et al. |

* cited by examiner

LIFT MONITORING SYSTEM AND METHOD

CROSS-REFERENCE TO RELATED APPLICATIONS

This application is a continuation-in-part of U.S. patent application Ser. No. 12/024,676, filed Feb. 1, 2008, which claims the benefit of U.S. Provisional Application No. 60/899,076, filed Feb. 2, 2007, the entire contents of each of which is incorporated herein by reference.

BACKGROUND OF THE INVENTION

Many insurance companies are considering offering, or do offer, discounts or variable pricing for automobile insurance based on data collected from vehicle telematics. Safety in the workplace includes perils beyond driving, including environmental conditions, physical stress and strain, and dangerous equipment. Sensors on the marketplace and in development can identify dangerous scenarios, including environmental conditions, worker behaviors, use or lack of use of proper safety equipment, and interactions with dangerous machines, substances or areas.

Workers' compensation insurance provides compensation for workers that are injured on the job. This compensation may include medical expenses, death benefits, and payments in lieu of lost wages. Workers' compensation insurance is state-mandated for most employees and is generally provided by private insurance companies, though some states operate a state fund.

Rates for workers' compensation insurance are set by state and are based on industry and job classification. Workers' compensation rating starts with a base rate, derived for each of some 600 classifications. This base rate is not modified for the smallest businesses, but for others, it is. These modifications include a mandatory application of an experience rating credit or debit, depending on a business's claims history compared to the average in that business class. Also, discretionary pricing modifications can be applied by the carrier depending on its underwriting evaluation of the account. Many large accounts share in the funding of their claims via large deductibles, policyholder dividends and retrospectively rated programs. These kinds of programs are generally referred to as "risk share" plans. For those businesses that are subject to experience rating or a "risk share" plan, their net cost of workers' compensation insurance is decreased to the extent they can either prevent, or mitigate the value of, claims.

Most insurance carriers that sell workers' compensation insurance provide professional services that help businesses prevent or mitigate the values of claims, primarily by reviewing the business's exposures and current controls, and by assessing the causes of prior claims and subsequently recommending and implementing solutions. Again, to the extent that these solutions reduce the number and dollar amount of claims, overall, the premium paid by the business will also be reduced. Loss control services are generally available to all businesses, but are most cost-effective for larger businesses.

Typically, loss control services are part of the basic product sold by an insurance carrier. However, loss control services may be made more effective and efficient by appropriately utilizing technology. In particular, sensor technologies that allow insured businesses to quickly identify unsafe situations, thereby providing the businesses with opportunity to correct them, and technologies that give insurance carriers automatic feedback and information on the safety performance of their policyholders, may beneficially contribute to a streamlined workers' compensation insurance evaluation system and advantageously decrease the risk of accidents in the workplace.

SUMMARY OF THE INVENTION

Thus a need exists in the art for systems and methods to monitor workplace activity which poses a higher risk of injury. Detecting risky behavior in advance can reduce incidents of injury, saving businesses money, and more importantly, improving the quality of life of their employees.

According to one aspect, the invention relates to a system for monitoring the lifting behavior of a subject. The system includes a wearable trunk sensor, a wearable thigh sensor, and a computing device, which in some embodiments is a portable computing device. The trunk sensor is worn by the subject, for example, on the subject's chest. It measures movement of the subject's trunk and outputs sensor data indicative of measured trunk movement. The thigh sensor is worn by the subject on his or her thigh. It measures movement of the subject's thigh and outputs sensor data indicative of measured thigh movement. In one embodiment, the thigh sensor, trunk sensor, and portable computing devices are separate distinct devices. Alternatively, the trunk or thigh sensor may be integrated with the portable computing device into a single housing.

The portable computing device is in communication with the trunk sensor and the thigh sensor from which it receives the trunk sensor data and the thigh sensor data. In one embodiment, the portable computing device receives the data from the trunk sensor and/or the thigh sensor via a transceiver configured for BLUETOOTH™, ZIGBEE™, ANT™, ANT+, or other wireless personal area network (WPAN) communication.

Based on the received data, the portable computing device is configured to determine a trunk angle and a thigh angle. In one embodiment, the trunk and thigh sensors include accelerometers. Preferably, the accelerometers output acceleration data in at least two dimensions. In this embodiment, the portable computing device is configured to determine the trunk and thigh angles using trunk and thigh acceleration data output by the accelerometers. In another embodiment, the trunk and thigh sensors include accelerometers and gyroscopes. In one particular implementation, trunk and thigh angle are calculated using a combination of accelerometer and gyroscope data received from the trunk and thigh sensors. For example, accelerometer data is used to correct received rotation data to take into account gyroscope drift. This drift-corrected rotation data is then used to calculate the trunk and knee angles. In another embodiment, the portable computing device is configured to determine trunk rotation in the transverse plane. It determines trunk rotation by comparing rotation data obtained from the trunk sensor with data obtained from the thigh sensor.

The trunk angle, thigh angle, and/or trunk rotation values are used to calculate a risk level associated with the subject's movement. In addition, the angle data is used to classify the movement into at least one predetermined lifting strategy, e.g., stoop, squat, and semi-squat. In various embodiments, the strategies also including lifting strategies that incorporate trunk rotation. In one embodiment, the risk level calculation is also based in part on the lifting strategy employed by the subject. The risk level calculation may be based in addition, or in the alternative, on predetermined movement thresholds.

The portable computing device outputs the results of the assessment and classification to the subject. For example, the feedback may indicate that the portable computing device detected an incidence of unsafe lifting strategy use or high-risk movement.

In one embodiment, the lift monitoring system also includes additional sensors, such as a weight sensor, in communication with the portable computing device. The weight sensor is used in one embodiment to determine the weight of an object being lifted, for example for inclusion in the risk level assessment algorithm. In addition, or in the alternative, data output by the weight sensor is used to determine a distribution of weight applied by the subject's feet. Such information can be used both in the risk assessment algorithm as well as in the movement classification algorithm. The weight sensors are, in various implementations, shoe borne pressure sensors or pressure sensors mounted into surfaces upon which the subject stands, e.g., a floor, ramp, platform, or truck bed. Alternatively, the weight sensor may be an RFID reader for interrogating RFID tags coupled to lifted objects and for extracting weight data encoded in data received from such RFID tags.

According to another aspect, the invention relates to a method of monitoring the lifting behavior of a subject. The method includes receiving trunk sensor data indicative of trunk movement and data indicative of thigh movement. The trunk movement data is received from a trunk sensor worn by the subject configured for measuring trunk movement. The thigh movement sensor is received from a thigh sensor worn by the subject configured for measuring thigh movement. A portable computing device then determines a trunk angle and a thigh angle based on the received trunk and thigh sensor data. Based on the determined trunk and thigh angles, the portable computing device calculates a lift risk level associated the subject's movements. The portable computing device also classifies the subject's movements as corresponding to one or more predetermined lifting strategies. The portable computing device outputs feedback to the subject. For example, the portable computing device provides feedback indicating a determination that the subject is employing an unsafe lifting strategy or an incidence of a high-risk movement.

According to a further aspect of the invention, the invention relates to a system including means for carrying out the above method. According to still another aspect, the invention relates to a computer readable medium storing instructions, which when executed by a processor cause the portable computing device referenced above to carry out the above method.

DETAILED DESCRIPTION

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

Figure 1:
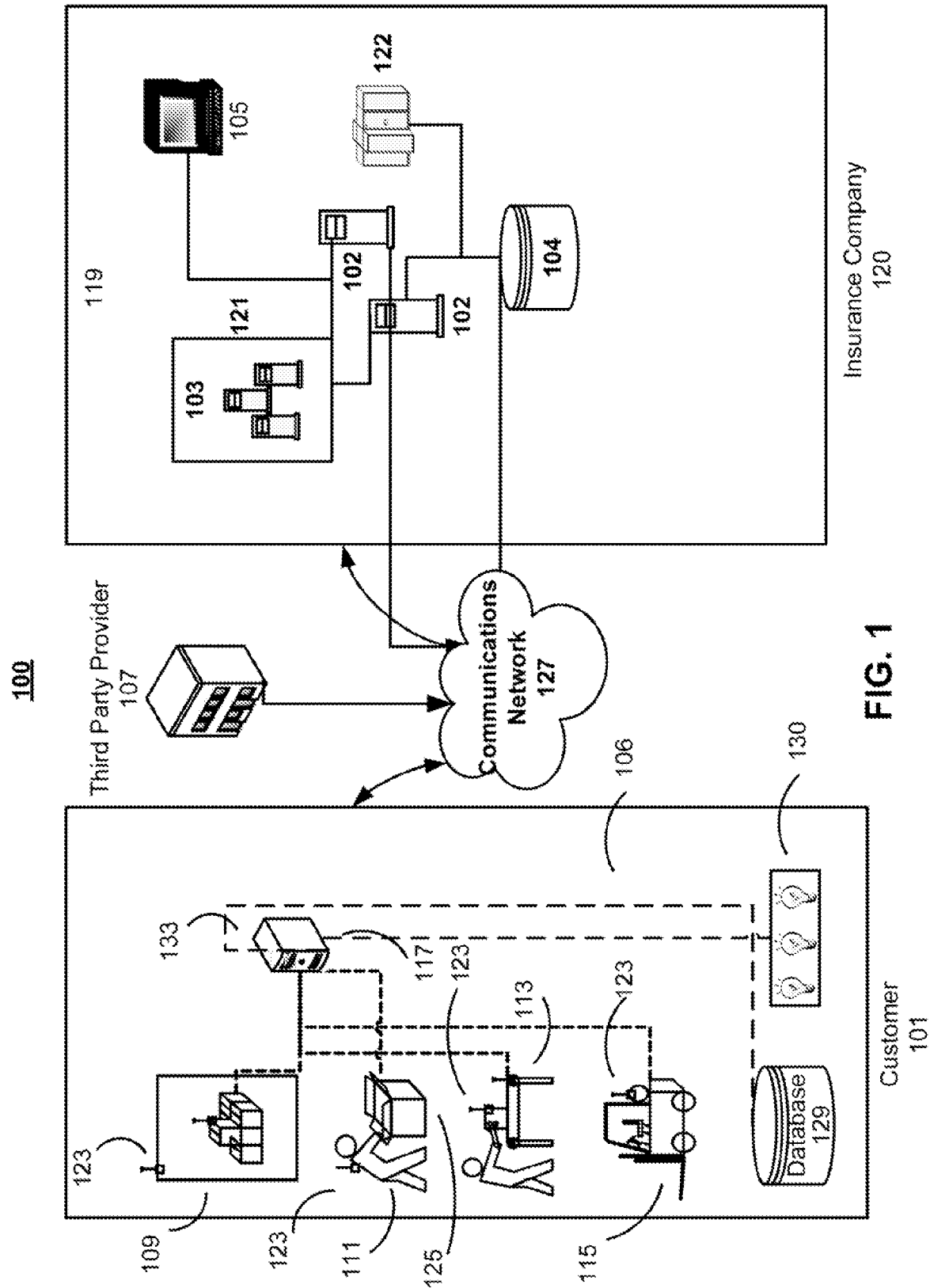
FIG. 1 is a schematic diagram of a system suitable for monitoring, evaluating, and providing feedback on employee workplace safety, according to an illustrative embodiment of the invention.

FIG. 1 a schematic diagram of a system 100 for monitoring, evaluating, and providing feedback on employee workplace safety at an insured entity. In FIG. 1, insurance company 120 provides customer 101 with insurance coverage. The type of insurance provided by insurance company 120 may be any type of insurance, such as general liability insurance, although the present invention is described primarily in terms of workers' compensation insurance. Customer 101 employs one or more employees 111. Employees 111 work at a workplace environment 109 that is affiliated with customer 101. Workplace environment 109 may include one or more facilities located together or separately from each other. Workplace environment 109 may not be at a fixed location, such as when customer 101 is a contractor who travels to various locations for work. Insurance company 120 can simultaneously provide services to multiple customers, although only one customer 101 is shown in FIG. 1 for clarity.

While on the job, employees 111 may have accidents or develop chronic ailments as a result of handling various types of hazardous machinery 113, equipment 115, and objects 125. A hazardous object 125 may be, for example, a heavy box of merchandise that employees 111 must lift. Hazardous object 125 can also be inherently dangerous, such as a radioactive or chemically toxic object. A few examples of hazardous machinery 113 and equipment 115 include cutting tools, electrical devices, and construction equipment. In addition, workplace environment 109 can be detrimental to the safety of employees 111 if it is prone to fires, breakdowns in proper ventilation, and other lapses in hazard containment.

To monitor the safety of employees 111 as they interact with the workplace, sensors 123 are established in various manners at workplace 109. Sensors 123 can be worn or carried around by employees 111, located on machinery 113, equipment 115, objects 125, and distributed around workplace environment 109. Sensors 123 are configured to take a variety of measurements. For example, motion detectors worn by employees 111 measure body motion as employees 111 move around and carry out various tasks at work. Multiple motion sensors may be worn on different body parts to obtain detailed body movement information. Motion sensors may monitor speed, acceleration, position, rotation, and other characteristics of body and appendage motion. There are sensors available for determining the body posture of employees 111, particularly while lifting heavy objects. Several suitable sensor systems are described below in relation to FIGS. 4A-5B. Chronic and acute back injuries are often the result of lifting objects using an improper lifting behavior and can lead to high valued workers' compensation claims. Pressure sensors embedded in the footwear of employees 111 or located on the floor of workplace 109 also provide information on the ergonomics of employees 111, such the weight and weight distribution over different parts of the body. Many other types of wearable sensors used to gain information about the work habits of employees 111 can be integrated into safety evaluation system 100, such as chemical sensors and GPS transceivers.

In addition to being worn or carried around by employees 111, sensors 123 are also be fixed on machinery 113, equipment 115, and objects 125. These sensors can also be motion, weight, heat, and pressure sensors, like the wearable sensors discussed above. For example, weight/force sensors may be used to measure the weights of objects 125. Heat sensors provide information on the functionality of machinery 113 and equipment 115. Overheating or malfunctioning equipment/machinery constitute a workplace hazard for employees 111. RFID transponders placed on machinery 113, equipment 115, and objects 125 are used to identify the machinery/equipment/object, or if paired with RFID transponders carried by employees 111, are used to determine the relative location of employees 111 with respect to various pieces of machinery 113, equipment 115, or objects 125.

Sensors 123 that are distributed at fixed locations around workplace 109 include heat sensors that monitor the temperature of the workplace. Digital cameras and camcorders can be mounted around workplace 109 to monitor and analyze employee actions, including lifting behavior when lifting heavy objects. The above described sensors and their purposes are discussed in more detail below in connection with the systems depicted in FIGS. 3-7.

Sensors 123 can be configured to transmit data continuously throughout the day, at or during specified periods of time, or in response to the detection of a particular event. Data from sensors 123 are collected and stored on local computer 133. Local computer 133 is a computer, a memory device, or a network of such devices that is capable of collecting, storing, and processing sensor data. Local computer 133 may be a mobile device, such as a smart phone, personal digital assistant (PDA), laptop, or micro PC. Alternatively, local computing device 133 may be an embedded computing platform built into sensors 123. Sensors 123 communicate with local computer 133 via communication system 106. Communications system 106 can be wired or wireless, and can utilize any appropriate communication technology, such as BLUETOOTH™, ANT™, ANT+™, ZIGBEE™ or WiFi. The internal communication network 106 between sensors 123 and local computer 133 is part of a larger communications network 127 that allows communication of information between customer 101, insurance company 120, and third party provider 107, whose functions are described further below. The devices connected to communication network 127, and the internal networks contained within, may employ data encryption and security software so that sensitive information, such as the medical histories of employees 111, are protected.

In addition to the data obtained from sensors 123, static data regarding employees 111, such as the age, height, level of physical fitness of each person, and data regarding industry safety standards is stored at an internal database 129 at customer 101. In one embodiment, data in internal database 129 supplements sensor data and is transmitted along with sensor data to insurance company 120 for processing. Internal database 129 may not necessarily be located at customer 101. It can be located or maintained at a remote location, but accessible by customer 101 and/or insurance company 120. In another embodiment, to enhance worker privacy, local computer 133 only transmits extracts of data to the insurance company 120. In one implementation, the extracts only include exception data, i.e., instances of increased risk activity, without reporting activity deemed to be safe. In other implementations, the extracts lack any personally identifiable information which could link any particular activity to the responsible monitored employee. In another implementation, the extracts transmitted to the insurance company 120 aggregates data over a period of time which may be event driven or period in nature.

Safety data obtained from sensors 123 and database 129 is transmitted via communications network 127 to insurance company 120 for evaluation. In general, as used herein, the term "safety data" refers to data obtained and processed by the system related to the safety of an employee's actions, as described herein. In one implementation, the safety data is transmitted directly from the sensors. In another implementation, the safety data is first processed by local computer 133 and then transmitted to insurance company 120 in synthesized form. The synthesized form may, for example, be in the form of any of the extracts, described above. The transmitted data may also pass through a third party provider 107. In one scenario, third party provider 107 is an outside expert hired by customer 101 or insurance company 120 to perform the analysis and evaluation of the sensor data. In another scenario, the third party provider 107 is a trainer hired to monitor and train employees on safe workplace activity. In another scenario, insurance company 120 purchases or obtains in another manner data from third party provider 107 instead of interacting directly with customer 101. Like local database 129, third party provider 107 can also be a source of information on industry safety standards, for example from NIOSH and OSHA.

In another embodiment, employees 111 and/or managers have direct access to local computer 133. For example, employees 111 and/or managers access local computer 133 to obtain safety reports indicating adherence to safety guidelines. In one implementation, to maintain employee privacy and/or restricted manager access, the local computer 133 is equipped with an authentication mechanism. The authentication mechanism may range from a simple password protection to advanced biometric identification, including fingerprint, retina, or voice recognition.

Insurance company 120 has a computer system 119 that includes application servers 102, load balancing proxy servers 103, data storage unit 104, business logic computer 122, and user interface module 105 to perform risk evaluation and underwriting based on the collected employee safety data. Employees of the insurance company 120 and other authorized personnel use user interface module 105 to access the insurance company computer system. User interface module 105 may be any type of computing device that is configured to communicate with other computer systems. User interface module 105 may be connected directly to application server 102, or may access an application server 102 via the load balancing proxy servers 103. User interface module 105 may connect to load balancing proxy servers 103 via a local area network, a private data link, or via the internet. Although depicted as being part of insurance company 120 in FIG. 1, user interface module 105 may be located remotely, such as onsite at an insured facility. The business logic computer 122 is connected to the data storage unit 104 and application servers 102 over a local area network 121, which may be part of communication system 127. In addition, other network infrastructure, including, for example a firewall, backup servers, and back up data stores, may also be included in the system 119, without departing from the scope of the invention. Communications over the local area network 121 and/or over the Internet, in one implementation, may be encrypted. In addition, such communications, whether encrypted or not, may also be digitally signed for authenticating the source of the communications. The computer system 119 may also include a certificate authority to authenticate one or more of the communications using public key infrastructure.

Based on employee safety data collected from the various sources described above, a safety evaluation module analyzes and evaluates employee safety of customer 101. As used herein, a "module" may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

In one implementation, the safety evaluation module is implemented in business logic computer 122. In other implementations, the safety evaluation module is implemented in application servers 102, on local computer 133, or is distributed across multiple elements of system 119. After the safety evaluation module evaluates the safety condition of customer 101, it sends feedback back to customer 101 via communications network 127 that is directed towards improving employee workplace safety. Feedback is provided to employees 111 through a visual, audio, or tactile stimulus, which is represented by flashing lights 130 in FIG. 1. Flashing lights 130 may, for example, flash when an employee 111 enters into a hazardous area or adopts an unsafe posture when lifting heavy object 125. Other types of feedback mechanisms include a vibrating device worn by employee 111 or an audio buzzer. Feedback may also be given to a manager, and then relayed to employee 111 in an indirect manner, such as in a verbal conversation between the manager and employee 111.

In one embodiment, the safety evaluation module is configured to limit recording and/or monitoring of non-work related activity. For example, the safety evaluation module may be programmed with scheduled employee work hours, break times, and work locations. In one implementation, if data is received outside of scheduled work hours, during break times, or at a location not included in the programmed work locations, data is ignored and/or deleted without further processing. In another implementation, similar filtering functionality is incorporated into the sensors 123 worn by the employee. In another implementation, sensors 123 worn by an employee include a user interface functionality by which the employee can indicate that he or she is "off-work". In such an implementation, the sensors platform ceases recording and/or transmitting data until the employee indicates a return to work.

A business logic module, implemented preferably in business logic computer 122, is used to underwrite or alter workers' compensation insurance pricing for customer 101 based on the received data. The business logic module may use predictive models, such as neural networks, Bayesian networks, and support vector machines, in performing the underwriting and premium adjustment. In one embodiment, the premium of the insurance policy is decreased if customer 101 employees exhibit safe practices. Conversely, insurance premiums are increased in response to unsafe employee performance. Instead of altering premium rates, other terms of the insurance policy can be altered, such as the policy deductible.

In another scenario, insurance company 120 awards customer 101 with premium discounts, or other advantageous rewards, simply for instituting a safety evaluation and feedback system. In this scenario, insurance company 120 does not receive actual safety data from customer 101. Insurance company 120 may award different discounts depending on policies instituted by customer 101 based on the output of the safety evaluation and feedback system. For example, insurance company 120 may award a discount if customer 101 has a safety policy of giving salary bonuses to employees 111 with good safety records. Insurance company 120 may also award a discount if customer 101 has a reward policy that promotes active participation of employees 111 in the safety evaluation system.

Figure 2:
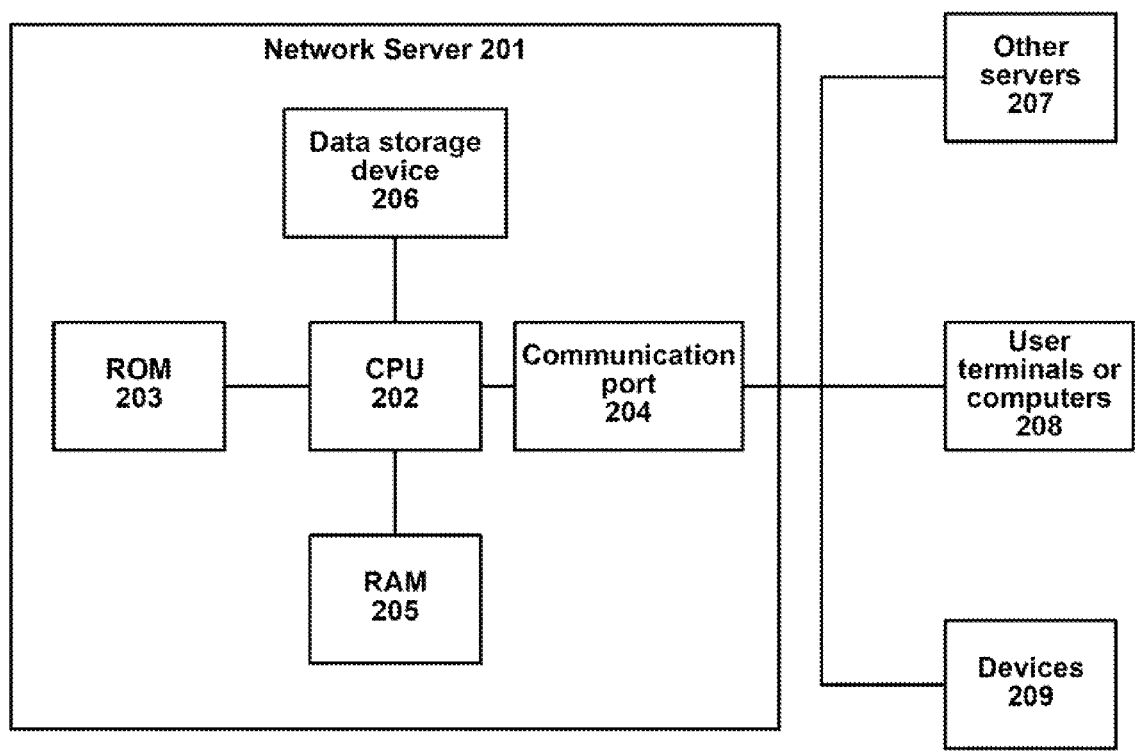
FIG. 2 is a block diagram of a computer network system that may be used in an embodiment of the invention.

Business logic computer 122 may be implemented based on the computer network system architecture shown in FIG. 2. Business logic computer 122 may have data storage capabilities of its own, or may access external data storage unit 104 for such purposes. In one implementation, data storage unit 104 is a data warehouse utilized by the insurance company 120. The data warehouse is the main electronic depository of the insurance company's current and historical data. The data warehouse includes one or more interrelated databases that store information relevant to insurance data analysis. The interrelated databases store both structured and unstructured data. In one implementation, one or more of the interrelated databases store electronic copies of insurance forms, either in an image format or a text-searchable format keyed to a customer or claim. Other databases in the interrelated databases store data, for example, in a relational database, in various data fields keyed to various identifiers, such as, without limitation, customer, data source, geography, or business identifier (such as Standard Industry Classification Code). The information stored in the data warehouse 104 is obtained through communications with customers, agents, vendors, sensors, and third party data providers and investigators. In particular, the data warehouse is configured to store data about customer employee safety, as well as related loss information, if any. Preferably, the computations required for risk evaluation and underwriting are primarily carried out by business logic computer 122, in order to free up the other resources for other tasks. The processes performed by business logic computer 122 in illustrative embodiments of the invention are described below in relation to FIG. 3.

In one implementation, software operating on the application servers 102 act merely as presentation and data extraction and conversion servers. All substantive business logic, including underwriting and pricing determinations, is carried out on the business logic computer 122. In this implementation, the application servers 102 obtain data from the data storage unit 104 and the business logic computer 122 and incorporate that data into web pages (or other graphical user interface formats). These web pages are then communicated by the application servers 102 through the load balancing proxy servers 103 to user interface module 105 for presentation. Upon receiving input from user interface module 105, the application server 102 translates the input into a form suitable for processing by the business logic computer 122 and for storage by the data storage unit 104. In this implementation, the application servers can be operated by third parties, who can add their own branding to the web pages or add other customized presentation data. In the alternative, at least some of the business logic is also carried out by the application servers 102. Application servers 102 may also include a webserver for automatically recovering or retrieving safety data from local computer 133.

In another implementation, the application servers 102 are software modules operating on one or more computers. One of the computers on which the application servers 102 are operating may also serve as the business logic computer 122 and/or as a load balancing proxy server 103.

In other implementations, the software operating on user interface module 105 includes a thin or thick client application in addition to, or instead of web browser. The thin or thick client application interfaces with a corresponding server application operating on the application server 102.

FIG. 2 is a block diagram of a computing architecture suitable for implementing various ones of the computing devices depicted in FIG. 1, including, for example, the business logic computer 122, application servers 102, and user interface module 105.

Computer 201 comprises at least one central processing unit (CPU) 202, at least one read-only memory (ROM) 203, at least one communication port or hub 204, at least one random access memory (RAM) 205, and one or more databases or data storage devices 206. All of these later elements are in communication with the CPU 202 to facilitate the operation of the computer 201. The computer 201 may be configured in many different ways. For example, computer 201 may be a conventional standalone computer or alternatively, the function of computer 201 may be distributed across multiple computing systems and architectures.

Computer 201 may be configured in a distributed architecture, wherein databases and processors are housed in separate units or locations. Some such units perform primary processing functions and contain at a minimum, a general controller or a processor 202, a ROM 203, and a RAM 205. In such an embodiment, each of these units is attached to a communications hub or port 204 that serves as a primary communication link with other servers 207, client or user computers 208 and other related devices 209. The communications hub or port 204 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors. The CPU 202 is in communication with the communication port 204 through which the CPU 202 communicates with other devices such as other servers 207, user terminals 208, or devices 209. The communication port 204 may include multiple communication channels for simultaneous communication with, for example, other processors, servers or client terminals.

Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 206. The data storage device 206 may comprise an appropriate combination of magnetic, optical and/or semiconductor memory, and may include, for example, RAM, ROM, flash drive, an optical disc such as a compact disc and/or a hard disk or drive. The CPU 202 and the data storage device 206 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 202 may be connected to the data storage device 206 via the communication port 204.

The data storage device 206 may store, for example, (i) a program (e.g., computer program code and/or a computer program product) adapted to direct the CPU 202 in accordance with the present invention, and particularly in accordance with the processes described in detail hereinafter with regard to the CPU 202; (ii) databases adapted to store information that may be utilized to store information required by the program. Suitable databases include data storage unit 104 of FIG. 1.

The program may be stored, for example, in a compressed, an uncompiled and/or an encrypted format, and may include computer program code. The instructions of the program may be read into a main memory of the processor from a computer-readable medium other than the data storage device 206, such as from a ROM 203 or from a RAM 205. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as safety data processing and insurance policy underwriting. The program also may include program elements such as an operating system, a database management system and "device drivers" that allow the processor to interface with computer peripheral devices 209 (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EE- PROM, any other memory chip or cartridge, or any other medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer 208. The remote computer 208 can load the instructions into its dynamic memory and send the instructions over an Ethernet connection, cable line, or even telephone line using a modem. A communications device 204 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As previously discussed with reference to FIG. 1, servers may also interact and/or control one or more user devices 209, such as displays and printers, or remote computers 208 such as, e.g., user interface module 105. User device 209 may include any one or a combination of a personal computer, a laptop, a personal digital assistant, a mouse, a keyboard, a computer display, a touch screen, LCD, voice recognition software, or other generally represented by input/output devices required to implement the above functionality.

Figure 3:
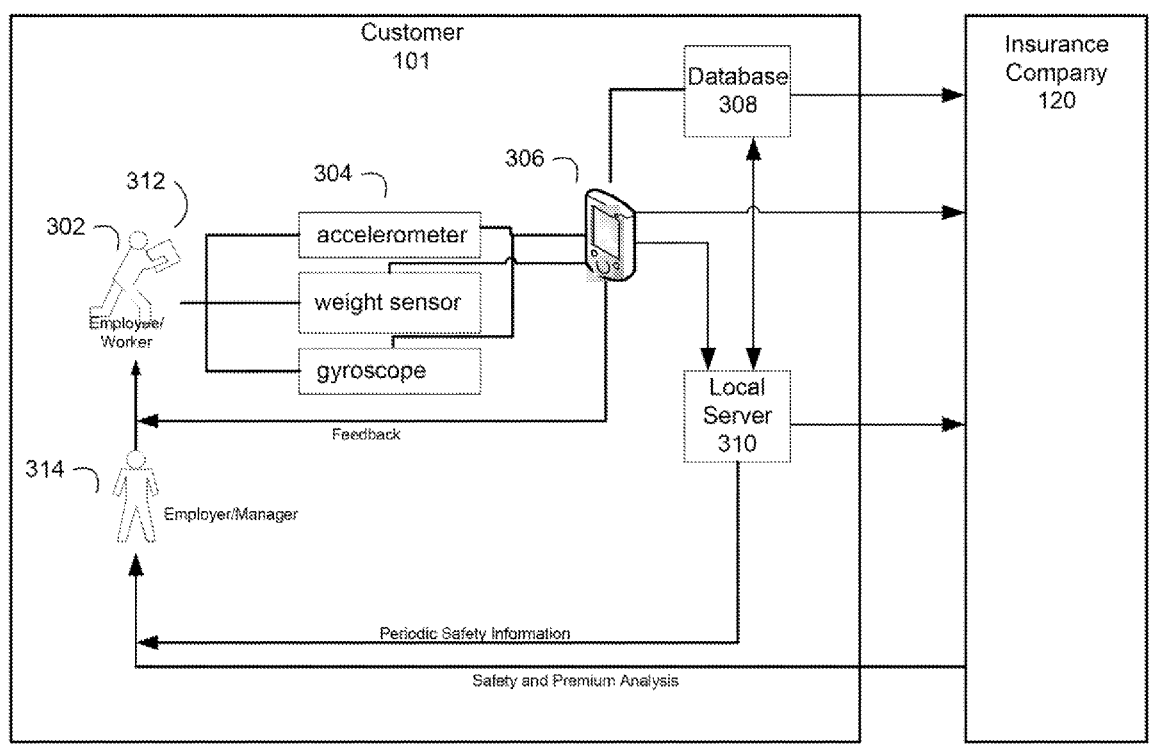
FIG. 3 is a schematic diagram of a first employee safety evaluation system, according to an illustrative embodiment of the invention.

FIG. 3 is a schematic diagram of an illustrative employee safety monitoring and evaluation system 300 where customer 101 is insured by insurance company 120. In FIG. 3, employee 302 of customer 101 is lifting a heavy object 312. This system is configured to monitor the likelihood of stress and strain injuries, which constitute a large potion of workers' compensation claims. As a participant of a safety evaluation system, employee 302 wears sensors 304 on his body to monitor his body posture, movement, and other lifting behavior while lifting object 312. Sensors 304 may be, for example, footwear with embedded weight/force sensors that measure his weight distribution, heat sensors to monitor overheating or overexertion, posture detection sensors and/or digital cameras to capture lifting behavior information.

As employee 302 performs the task of lifting object 312, the above described sensors transmit data to computing device 306. In one embodiment, computing device 306 is a mobile computing device, such as a smart phone, laptop, micro PC, or an embedded computing platform built into the sensor platform. Data is transferred between sensors 304 and computing device 306 via any kind of wireless communication system, such as a BLUETOOTH™, ANT™, ANT+™, ZIGBEE™ or WiFi network. Computing device 306 collects, aggregates, and stores the transmitted data. Computing device 306 also performs calculations and analyses on the transmitted data, such as noise filtering and mathematical operations to synthesize more meaningful data.

In addition to data derived from sensors, static data is also available and stored in database 308. Static data includes data such as the name, medical history, job characteristics, and other personal facts regarding employee 302. Static data also includes the weight, attachment points, and dimensions of object 312. This type of data is used by computing device 306 in conjunction with sensor data to evaluate the safety of employee actions. For example, it could be considered unsafe for an employee weighing 110 lbs and in poor physical shape to lift a 50 lbs object, while a different employee weighing 150 lbs and in good shape could do the same task safely. Static data stored in database 308 optionally includes industry safety standards set by NIOSH and OSHA. These industry standards are used in some implementations as a benchmark for safety evaluation. In some embodiments, the safety evaluation results in a lifting safety indicator that insurance company 120 uses in altering the policy terms.

Computing device 306 provides employee 302 with immediate feedback about his lifting behavior through a stimulus. For example, a light may blink whenever employee 302 adopts unsafe lifting behavior. Alternatively, a vibrating apparatus worn by employee 302 or an audio stimulus is activated to relay the same message. In one implementation, feedback stimuli is activated by computing device 306 only when employee actions pass a certain quantitative threshold. To obtain a safety evaluation score to compare to the threshold, computing device 306 applies a quantitative algorithm to the received data. Feedback may be provided in real-time or at a later date. For example, feedback may be given at regular intervals or upon an employee exceeding a safety threshold.

In addition to computing device 306, which may be a handheld mobile device and insufficient for all the computing and storage needs of the evaluation system, there may be a local server 310 connected to computing device 306. Local server 310 communicates directly with database 308 and sensors 304. Data may be transferred between local server 310 and the other elements of the system via a USB, wired LAN, WiFi, or cellular connection. The network connection is preferentially secure, for example according to standards derived from pertinent state and federal regulations for data security and privacy, including, without limitation, guidelines established to comply with the Health Insurance Portability and Accountability Act, so that personal data such as employee medical history is protected. To this end, certain data may be encrypted and/or stripped of personal identification data, whereas other, less sensitive data may be sent without encryption or without having such information stripped. Local server 310 performs local processing such as collecting raw sensor data over time and aggregating information for analysis across all users of the safety evaluation system. Local server 310 can be located onsite at customer 101 or be a product or service offered by a third party.

In one implementation, local server 310 generates periodic safety reports on all the employees 302 for management of customer 101. Management can then use these reports to provide feedback to employees 302 to promote safer behavior. These reports may also be used by management to create policies that promote safe behavior. For example, the fraction of safe to unsafe lifts performed by an employee 302 or other lifting safety indicators may be included in the report, and management may award employee 302 a year-end bonus or other benefit or recognition based on this indicator. As with local computer 133, employees 302 may also be able to access data stored on the local server 310, using for example, authentication mechanisms known in the art.

Local server 310, computing device 306, database 308, and sensors 304 may also transmit data directly to insurance company 120. Data transmission between these elements and insurance company 120 may occur in a variety of ways, such as via secure email, HTTPS protocol, and XML messages over a SOAP protocol. Insurance company 120 may use this data for safety and premium analysis. As described above, certain components, if not all, of the transmitted data may be transmitted in a secure fashion as required by state and federal regulations.

Safety analysis includes any safety assessment, risk evaluation, or risk improvement services. Services offered may include loss control services such as the dispatch of safety experts employed by insurance company 120 to advise on dangerous scenarios at the workplace. Loss control services may be provided, for example, after insurance company 120 is alerted of unsafe circumstances at a customer workplace through reports sent from local server 310. Modification of these services based on the received data may include an increase or decrease in frequency of the service, a change in the cost of the service, and targeting a specific safety concern.

Premium analysis includes activities that potentially affect a customer's premium, deductible amount, discounts or credits, as well as large scale analysis to provide input into industry or occupation experience factors. The determination of premium and offering of discounts or credits may be performed once at underwriting time, regularly on an interval, continuously, in response to an event, or retroactively, as permitted by local, state, and/or federal regulations.

The analysis and decisions made by insurance company 120 with regard to premium/service adjustments and safety evaluation may be transmitted back to customer 101. This information may be stored at local server 310, or on another device at customer 101. This information may be directly accessible by employees 302 of customer 101 or may be relayed to employees 302 by manager 314.

Insurance company 120 may save the data and reports received from customer 101, and the decisions that were made based upon them, in data storage unit 104, which was discussed in FIG. 1, or in a separate data warehouse. This archived data may be used for future retrospective analysis, claims adjudication, and/or to support fraud investigation.

Figure 4A:
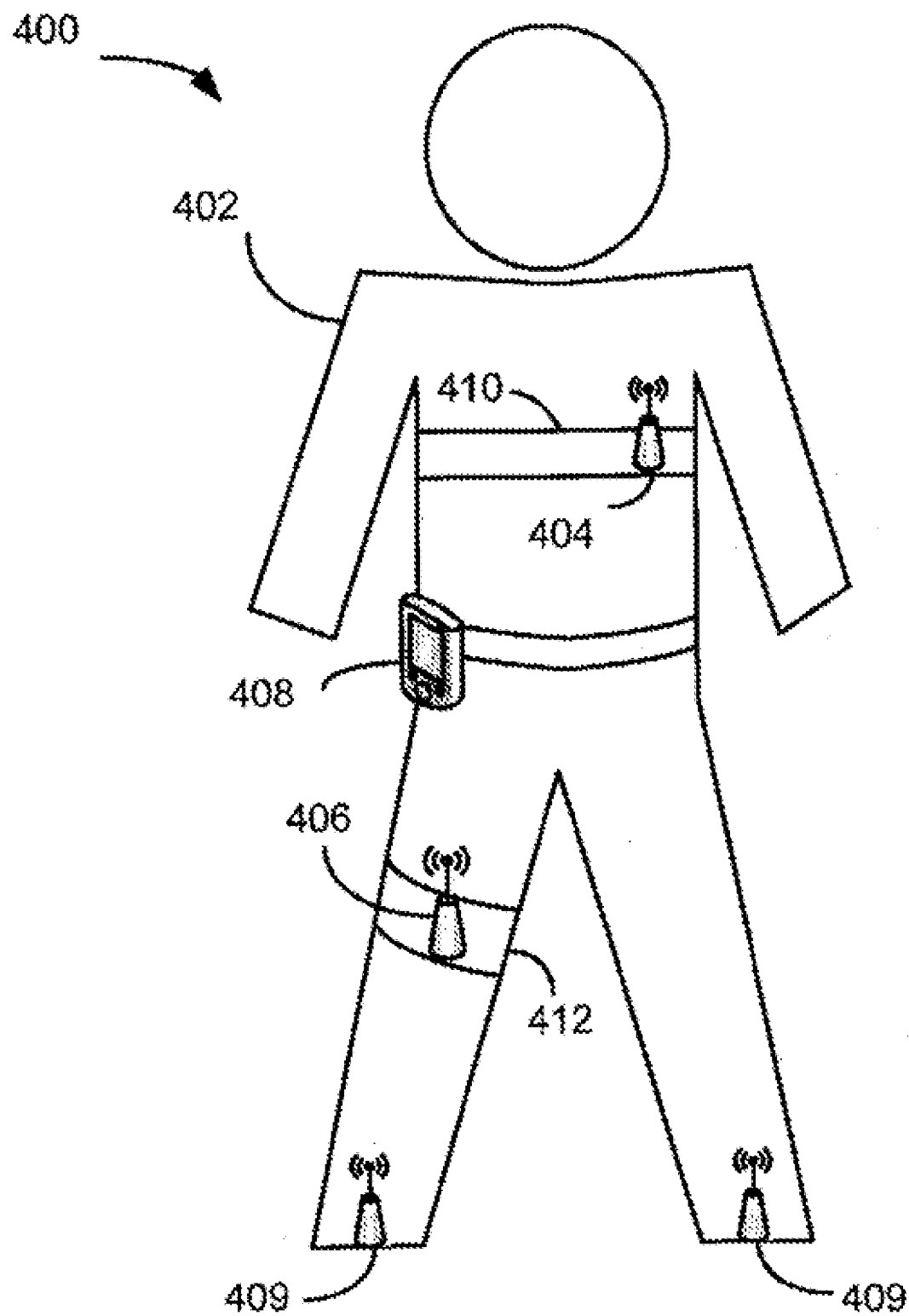
FIG. 4A is a schematic diagram of a lift monitoring system being worn by a monitored subject, according to an illustrative embodiment of the invention.

FIG. 4A is a schematic diagram of a lift monitoring system 400 being worn by a monitored subject 402, according to an illustrative embodiment of the invention. The lift monitoring system 400 includes a trunk sensor 404, a thigh sensor 406 and a portable computing device 408. The trunk sensor 404, thigh sensor 406 and portable computing device 408 communicate wirelessly, for example according to a BLUETOOTH™, ANT™, ANT+™, or ZIGBEE™ protocol. The lift monitoring system may optionally include shoe sensors 409.

In one implementation, the trunk sensor 404 is coupled to a chest strap 410 to securely hold the trunk sensor 404 in position. Alternatively, the trunk sensor 404 may be coupled to a shoulder strap, an undergarment, or other article of clothing. The trunk sensor may also be incorporated directly into an article of clothing. While the trunk sensor may be worn anywhere on the torso of the subject 402 (front or back), preferably, the trunk sensor 404 is coupled to the strap 410 or garment such that it is lies below the subject's right clavicula, near the coracoid process of the subject. In addition, it is preferable that when worn, the trunk sensor 404 is coupled to the subject 402 securely enough to reduce movement of the trunk sensor 404 relative to the subject 402, to reduce the introduction of additional noise.

The thigh sensor 406 is coupled to a thigh strap 412. Alternatively, the thigh sensor may be kept in a secure thigh pocket or be incorporated directly into pants worn by the subject 402. While exact placement is not essential, preferably the thigh strap is worn by the subject 402 such that the thigh sensor 406 is positioned on the front of his or her thigh at the measured midpoint between the anterior superior iliac spine and top of the patella.

The portable computing device 408 may be worn, for example on the belt of the subject 402, or carried in or on the pants of the subject 402.

In one embodiment, the lift monitoring system 400 is suitable for use in the employee safety monitoring and evaluation system 300 of FIG. 3. The trunk sensor 404 and thigh sensor 406 are suitable for use as sensors 304. The portable computing device 408 is suitable for use as computing device 306. Data logged on the portable computing device 408 can be transferred, as described further below, to remote computing devices such as local server 310 and database 308.

Figure 4B:
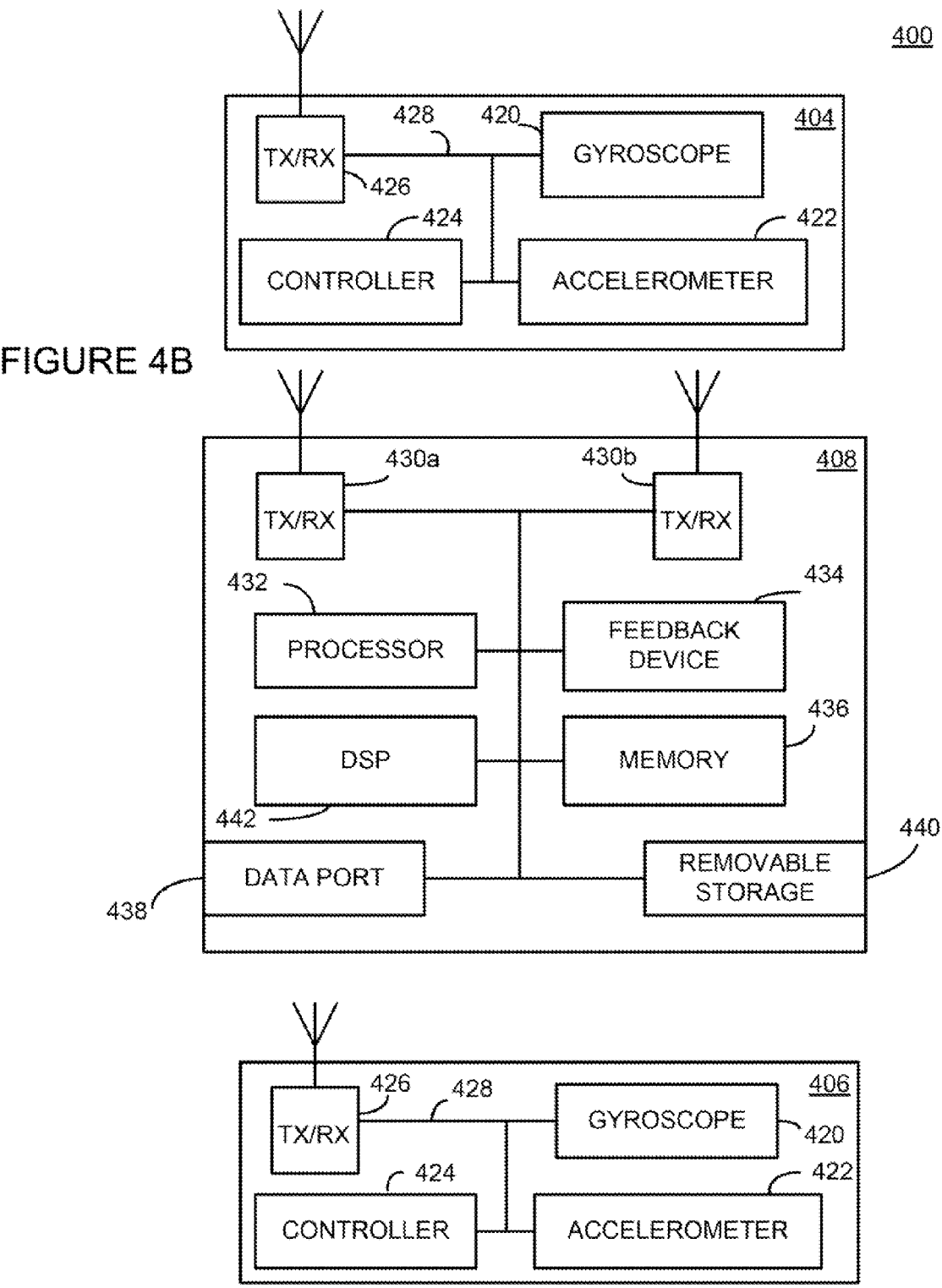
FIG. 4B is a block diagram of the components of the lift monitoring system of FIG. 4A, according to an illustrative embodiment of the invention.

FIG. 4B is a block diagram of the components of the lifting monitoring system 400 of FIG. 4A, according to an illustrative embodiment of the invention. As described above, the lift monitoring system 400 includes a trunk sensor 404, a thigh sensor 406, and a portable computing device 408. In one implementation, the trunk sensor 404 and thigh sensor 406 are identical other than their intended placement on the body. Each sensor 404 or 406 includes one or more gyroscopes 420, one or more accelerometers 422, a controller chip 424, and a transceiver 426. Preferably, these components are coupled to a single integrated circuit backplane 428. Alternatively, the components are coupled via ribbon interconnects or other electrical connection mechanism known in the arts. One sensing platform that may be used as the trunk sensor 404 or thigh sensor 406 is the IMU 6 Degrees of Freedom v2 sensing platform (the "IMU6"), available from Sparkfun Electronics of Boulder, Colo. The IMU6 includes three gyroscopes 420 providing pitch, roll, and yaw readings, a triple axis accelerometer 422, as well as temperature sensors. The IMU6 also includes a BLUETOOTH™ transceiver 426.

The gyroscopes 420 and accelerometers 422 of the trunk and thigh sensors 404 and 406 output voltage values, which are quantized and then transmitted to the portable computing device 408 by the transceivers 426. The portable computing device 408 then processes the received voltage data to derive actual acceleration and rotation data as described further below.

The portable computing device 408, includes two transceivers 430a and 430b, a processor 432, a feedback device 434, memory 436, a data port 438, and a removable storage device 440. The portable computing device may also include an optional digital signal processor 442.

In one embodiment, the portable computing device is a personal digital assistant (PDA), or a smart phone, such as a WINDOWS MOBILE™ enabled smart phone. In such embodiments, a first transceiver 430a is dedicated for cellular, 3G, Wi-Fi, Wi-Max, or other networked communication. The first transceiver 430a is responsible, for example, for communicating data previously received, processed, and logged from the trunk and thigh sensors 404 and 406 to a remote computing device. The second transceiver 430b is dedicated to communicating with the sensors 404 and 406, e.g., via the BLUETOOTH protocol. Other suitable communication protocols for the second transceiver 430b include ANT, ANT+, and ZIGBEE.

The processor 432 manages the remaining components of the portable computing device 408. The processor 432 is also responsible for carrying out the data processing steps described below for analyzing data received from the sensors 404 and 406 and evaluating movements of the subject 402 indicated by such data. As described further below, in certain circumstances, the processor 432 may direct the feedback device 434 to output information to the subject 402.

In analyzing the received data, the processor 432 first filters the received data, and then calculates acceleration and rotation values based on the filtered data. Acceleration is calculated by first converting the raw voltage values output by the accelerometers into units of gravity (Gs). The processor 432 uses the calculated Gs to determine an angle of a body segment (e.g., trunk or thigh) with respect to vertical ("segment angle"). Acceleration in terms of Gs is calculated according to the following formula:

$$Acceleration=(Reading-Baseline)*ADC\_Step, \quad (1)$$

where Reading corresponds to a current reading, Baseline corresponds to a baseline voltage value determined during a calibration phase (discussed further below). A typical Baseline value for the IMU6 is about 344. ADC_Step is determined according as follows:

$$ADC\_Step=Voltage/(Steps*Sensitivity), \quad (2)$$

which for the IMU6 equals 5V/(1023*0.8). As known to one skilled in the art, these specific values are device dependent, are obtainable from the device manufacture, and vary depending on the specific sensor platform employed.

The segment angle is derived from acceleration values in three dimensions, one corresponding to acceleration parallel to gravity (i.e., in the up/down dimension) denoted below as Ax, one parallel to the ground in the side to side dimension denoted below as Ay, and one forward/backward dimension denoted below as Az. Based on these three acceleration values, x y, and z, segment angle is calculated as:

$$Angle=\tan^{-1}(Az/(\text{sqrt}(Ax^2+Ay^2))). \quad (3)$$

The processor 432 may determine rotation values by first calculating an angular rotation rate, and then integrating the determined rate of rotation over time. Rotation rate ω is calculated according to the following formula:

$$\omega=(Raw-Equilibrium)/ADC\_step*sensitivity, \quad (4)$$

where Raw corresponds to a current gyroscope output voltage, Equilibrium is a baseline gyroscope voltage output determined during a calibration phase, and the ADC_step and sensitivity values are device dependent values. For the IMU6, Equilibrium value should be about 512, ADC_step is 1023 (the device provides a 10-bit voltage reading), and the sensitivity is about 0.8. Thus, for the IMU6 ω is equal to:

$$(Raw-512)/1023*0.8. \quad (5)$$

While many integration techniques may be used, it was determined experimentally that a suitable tradeoff between precision and processing load was achieved by using a trapezoidal integration method using a Δt value of 1/(sample frequency), which in one implementation is about 0.03 seconds. To differentiate trunk rotation from full body rotation, trunk rotation is determined by calculating the difference between the rotation derived from trunk sensor rotation data and thigh sensor rotation data. In alternative embodiments, rotation is determined, for example, based solely on trunk rotation data or on data collected from an additional sensor coupled to the subject's pelvis.

While in some embodiments, the processor 432 uses rotation data solely to determine trunk rotation, in other embodiments the processor 432 uses rotation data to determine segment angles. In such embodiments, acceleration data is used to correct for gyroscopic drift. One suitable method for making such a calculation is described in "Measuring Orientation of Human Body Segments Using Miniature Gyroscopes and Accelerometers" by Luinge et al., published in *Medical and Biological Engineering and Computing*, April 2005. In still other embodiments, instead of directly calculating angles and rotation rates from the raw data, the raw data is processed using a pattern matching process, for example, a Markov or Hidden Markov Model, to compare measured values to prior observed data.

Figure 6:
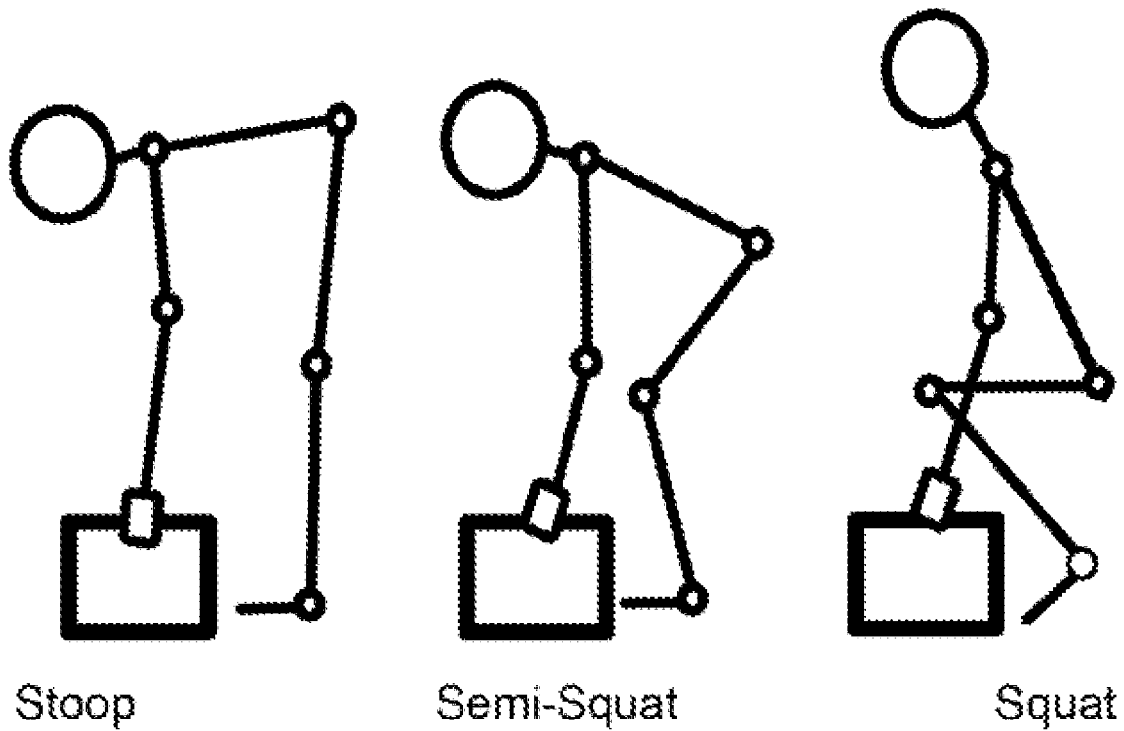
FIG. 6 includes schematic diagrams of three lifting strategies discernable by the lift monitoring systems of FIGS. 4A-5B, according to an illustrative embodiment of the invention.

In one implementation the angle information calculated from the raw sensor data is used to determine body posture, specifically trunk and thigh flexion calculated based on the measured relationship between the corresponding body segment position and vertical. Alternatively, the processor 432 also uses information from the calibration of the system along with angular data from either or both sensors to determine trunk and thigh flexion and how they contribute to the overall risk assessment. Using obtained segment angle and/or rotation motion parameters, the processor 432 evaluates the motion of the subject 402 in two ways. The processor 432 classifies the movement into one or more predetermined movement classes and associates a risk level associated with the movement. For example, in one embodiment, the processor monitors the segment angle and rotation motion parameters to identify and classify lifting strategies employed by the subject. Clinical literature identifies three primary lifting strategies employed by most individuals: stoop, semi-squat, and squat. Illustrations of these strategies are depicted in FIG. 6. Each strategy can be identified in part based on the degree of the trunk and knee flexion of the lifter during the lift, which in turn can be identified based on the angle of the lifter's trunk and the angle of their thigh. Lifters employing the stoop strategy exhibit trunk flexion at some point during the lift of greater than about 60° and exhibit knee flexion of no more than about 45°. Lifters employing the semi-squat strategy exhibit trunk flexion at some point during the lift of about 45° and knee flexion of about 45°. Lifters employing the squat strategy exhibit trunk flexion of less than about 30° throughout the lift and more than 45° of knee flexion at some point during the lift. In addition, in a semi-squat lifting strategy, the lifter typically maintains his or her feet fully on the ground, whereas in the full squat strategy, the lifter's heels lift off the ground. As each individual's body geometry is at least slightly different, and individuals tend to utilize their own lifting strategy, in one embodiment, the processor 432, based on experimental data and the general guidelines described above, utilizes the following angle ranges to classify lifts (of objects located on the floor:

TABLE 1

Lifting Strategy Angle Ranges

| Strategy | Trunk Angle Range (°) | Thigh Angle Range (°) |
| --- | --- | --- |
| Stoop | 68.3-127.1 | 9.32-37.88 |
| Semi-Squat | 30.88-68.36 | 41.28-108.52 |
| Squat | 19.84-47.16 | 56.8-115.2 |

In alternative embodiments, the processor 432 classifies movements into additional categories corresponding, e.g., additional lifting strategies, hybrid lifting strategies, and certain non-lift movements. In still other embodiments, the processor 432 employees separate criteria for lifts from different heights. For example, the criteria set forth above is used for lifts from the floor and other criteria are used for lifts from heights above ground. Initial height may be determined dynamically, e.g., based on the range of segment angles exhibited during a lift, or acceleration in the vertical direction coupled with individual lifter characteristics, such as the lengths of various lifter body segments (arms, legs, torso, etc.). Alternatively, the processor may be configured to assume an initial height based on known workplace conditions.

As mentioned above, the processor 432, in addition to classifying detected movement, assigns a risk level to the movement. The granularity of risk determination, in various embodiments, ranges from a binary risk determination (i.e., high risk or not high risk) to a highly granular assessment. The assessments may be made on instantaneous data or a time series of data. Based on a review of the clinical literature it was determined that three movements in particular posed increased risk to subjects 402: lifts in which the subject exhibits greater than 60° of trunk angle, lifts in which the subject 402 exhibits thigh angle of greater than 45°, or lifts in which the subject 402 rotates in transversal plan more than 10° during a lift. In general, in lifts with increased trunk and knee flexion, a subject 402 no longer sufficiently supports a load with his or her muscles and puts undue strain on their ligaments. Lifting while rotation may lead to back injuries, such as disc protrusion. Repeated movements meeting these criteria can lead to persistent if not permanent injury. Thus, in one implementation employing a binary risk assessment, the processor deems a movement as high risk if the movement satisfies one or more of the above-identified high risk conditions. Alternatively, the risk assessment may involve a more complex function of the trunk angle, thigh angle, object weight, lifting strategy, horizontal distance traveled during a lift, vertical height lifted, load stability, locomotion data, the slope of the ground, lift frequency, lift rate, individual lifter characteristics, and/or temperature.

In one embodiment, the feedback device 434 is a display screen. In such embodiments, the processor may direct the display to render a textual or graphical warning in response to the processor detecting movements posing elevated risks to the subject 402. In addition, the processor may direct the display screen to render additional text or graphics related to the subject's movements over a period of time, including for example, a total number of increased risk movements or a percentage of movements posing an increased risk. In addition, or in the alternative, the portable computing device 408 may include a vibrating element, an audio speaker, a light emitting diode, or other feedback mechanism to alert the subject 402 of increased-risk movements. The processor 432 may direct the feedback device to output feedback at each detection of a dangerous movement, after detecting a threshold number of dangerous movements, or after determining that greater than a threshold percentage of a subject's lifts constitute dangerous movement.

The memory 436 includes both volatile and non-volatile memory. The volatile memory serves as system memory for storing computer executable instructions for the above functionality during execution of such instructions, as well as storing data currently being processed. The non-volatile memory, including, for example a hard-drive or flash-based memory stores the computer executable instructions when not in use. The non-volatile memory also stores data received from the sensors 404 and 406, as well as the results of the processing of such data by the processor 432. In one embodiment, the processed data is stored on a removable memory card inserted into the removable memory device 440. The removable memory device 440 may be a card reader, such as a SD, miniSD, microSD, MemoryStick or other card reader. The data port 438 may be, for example, a USB, USB2, mini-USB or FIREWIRE™ port.

In one implementation, for example, in which the portable computing device 408 is designed specifically for the lift monitoring system 400, the portable computing device 408 includes a digital signal processor 442 or other co-processor, e.g., to digitally filter data received from the sensors 404 and 406.

In alternative embodiments, the lift monitoring system 400 employs additional sensors in the classification and risk assessment processes. For example, in one embodiment, the portable computing device 408 is in communication with a weight sensor. In one implementation, the weight sensor is a pressure sensor, such as shoe sensor 409, worn in the shoes of the subject 402. The weight sensor may include a single pressure sensor in one shoe, pressure sensors in both shoes, or multiple sensors in each shoe. Data collected from the pressure sensors can aid in distinguishing squat from semi-squat lifting strategies by allowing the portable computing device 408 to determine whether the subject 402 maintains pressure on their heel throughout a lift. In an alternative implementation, pressure sensors are mounted into a floor upon which the subject 402 carries out his or her activities. In still another implementation, instead of using a pressure sensor, the weight sensor is a RFID reader which interrogates RFID tags coupled to objects being lifted by the subject 402. Preferably, the RFID tags store and emit data indicative of the weight of the object. In some implementations, the RFID tags also store and emit data indicative of the dimensions of the object. The processor 432 of the portable computing device 408 may then use the weight data obtained from the weight sensor in making risk assessment decisions. For example, in one implementation, the processor applies a weight threshold, below which movements which otherwise would be considered of increased risk are disregarded. In another implementation, the processor tracks the total weight lifted using risky lifting behavior and triggers an alert after a threshold total weight has been lifted using increased-risk lifting techniques.

In another embodiment, the processor 432 of the portable computing device takes temperature information into account in making its risk assessment. The IMU6 sensing platform includes temperature sensors suitable for obtaining such information. As soft tissue tends to be less flexible in colder temperatures, the processor 432, in this embodiment adjusts the thresholds for determining high risk activity to take into account the ambient temperature. Specifically, the threshold is adjusted downwards in lower lifting temperatures. If a temperature sensor is not available, expected temperature can be entered into the portable computing device 408 during calibration.

Other data suitable for including the risk analysis provided by the processor 432 include, without limitation, load stability, horizontal and/or vertical distances traveled, and ground slope. In addition to the sensors identified above, the data may alternatively be obtained from other sensors including cameras, strain gauges, motion detectors, or other suitable sensors.

In still another embodiment, other sensors and functionality may be integrated into the lift monitoring system to increase a subject's willingness to wear the devices. That is, the device is configured to provide information of interest to the subject 402, but which may not necessarily be of interest in evaluating lifting behavior. For example, a calorie counter, heart rate monitor, or other sensor may be incorporated. The heart rate data advantageously may be employed to alert the subject 402 or a supervisor of over exertion, e.g., to avoid cardiac incidents.

In still other embodiments, the lift monitoring system 400 employs fewer sensors. As a result, the system may provide less, or less accurate information, but is less expensive, more easily adopted by subjects 402 due to a smaller form factor, and have a longer battery life. For example, in one implementation, the lift monitoring system 400 forgoes the use of gyroscopes, sacrificing the ability to identify trunk rotation. In another implementation, the lift monitoring system uses only gyroscope data, and not accelerometer data. The results are less accurate due to uncorrected gyroscope drift, but may be sufficiently accurate to identify dangerous movements. In another implementation, the lift monitoring system forgoes use of a thigh sensor. Trunk angle data can serve as a surrogate for trunk flexion, though trunk flexion is more accurately determined and/or approximated if both trunk angle and thigh angle are known. In general, trunk angle and thigh angle serve as a reasonable and useful surrogates for trunk flexion and knee flexion. Notwithstanding this fact, in certain implementations, the lift monitoring system processes the trunk and knee angles along with, for example, information about the work environment and body structure of the subject 402 to calculate actual flexion values.

Figure 5A:
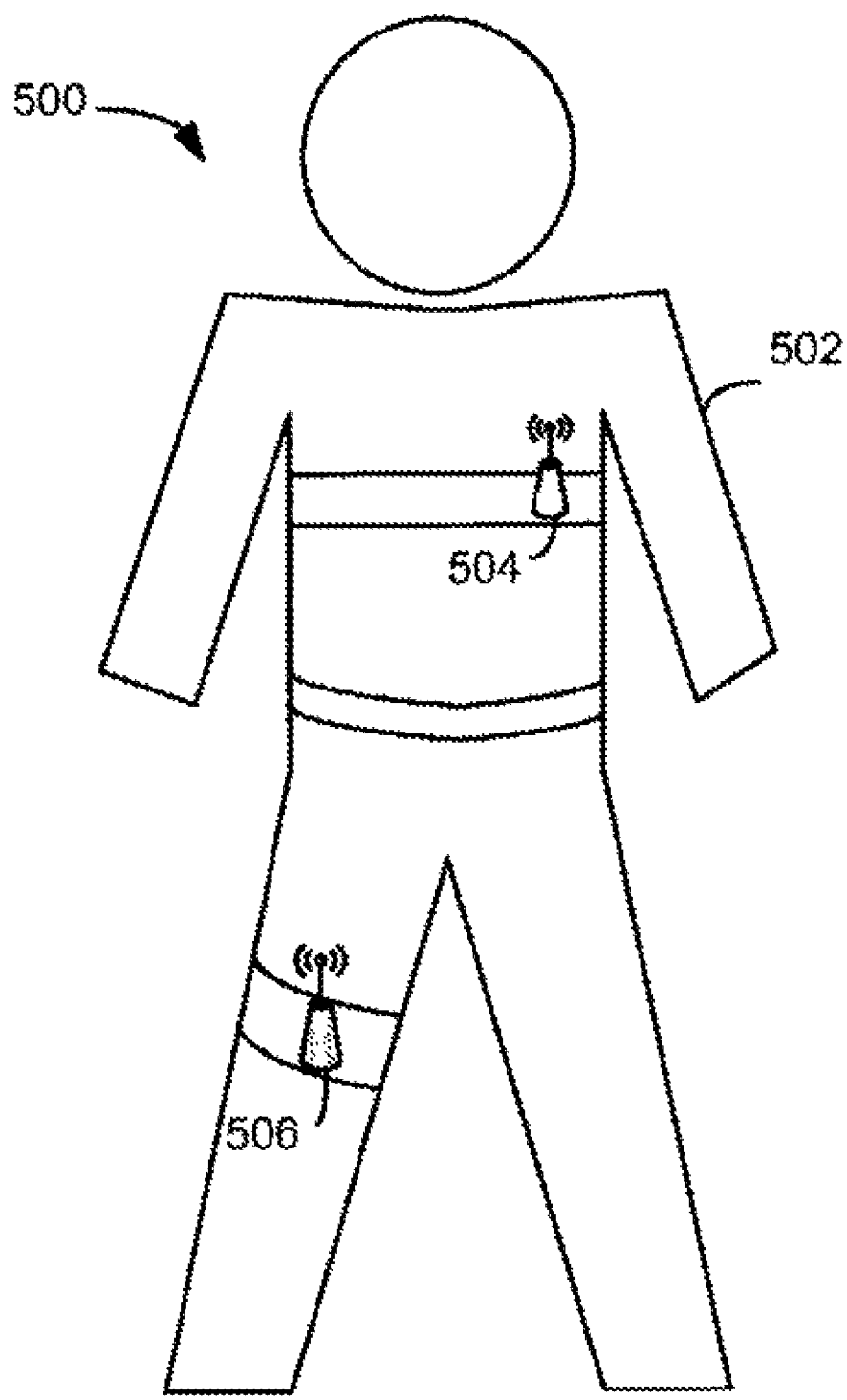
FIG. 5A is a schematic diagram of a second lift monitoring system being worn by a monitored subject, according to an illustrative embodiment of the invention.

FIG. 5A is a schematic diagram of a second lift monitoring system 500 being worn by a monitored subject 502, according to an illustrative embodiment of the invention. As in the lift monitoring system 400 of FIG. 4A, the lift monitoring system 500 includes a trunk sensor 504 and a thigh sensor 506. In contrast to the lift monitoring system 400 of FIG. 4A, instead of including a separate portable computing device 408, the processing and feedback functionality provided by the portable computing device 408 is integrated into either the trunk sensor 504 or the thigh sensor 506, preferably on the same platform and coupled to a common backplane 523.

Figure 5B:
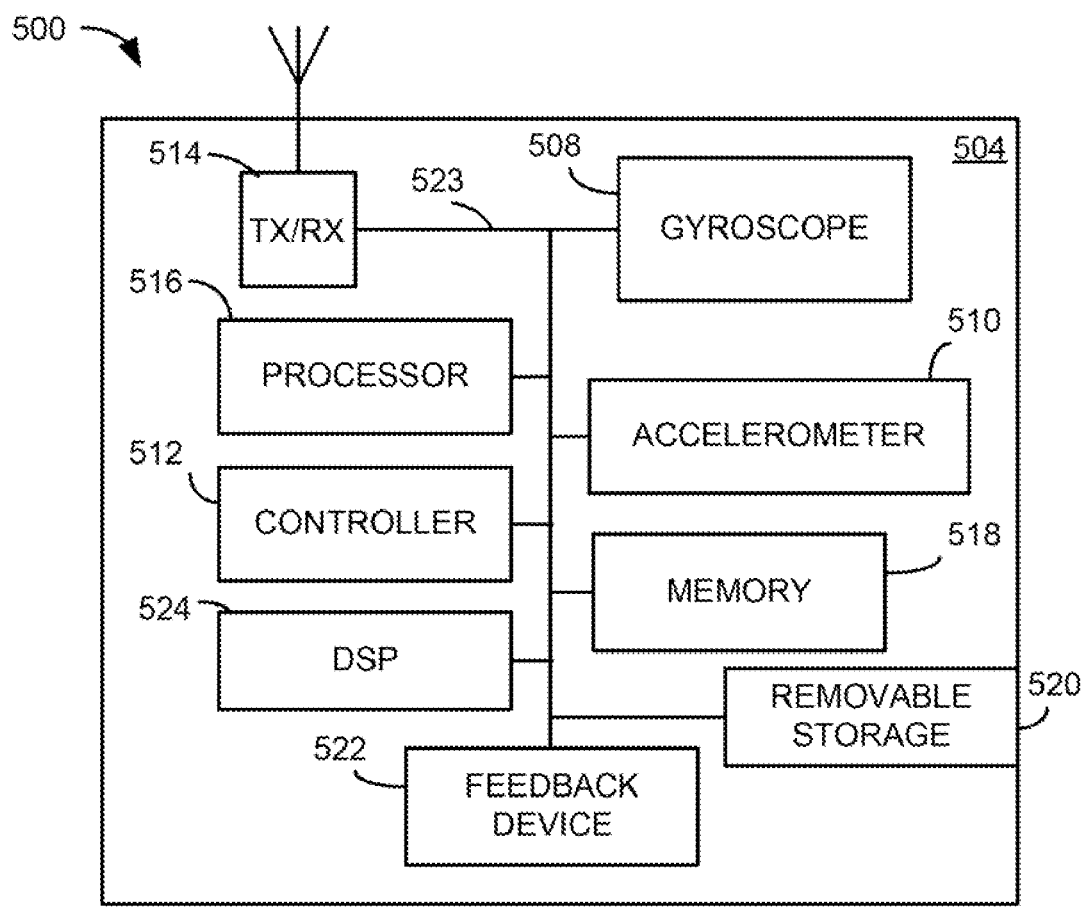
FIG. 5B is a block diagram of the components of the lift monitoring system of FIG. 5A, according to an illustrative embodiment of the invention.
Figure 5B:
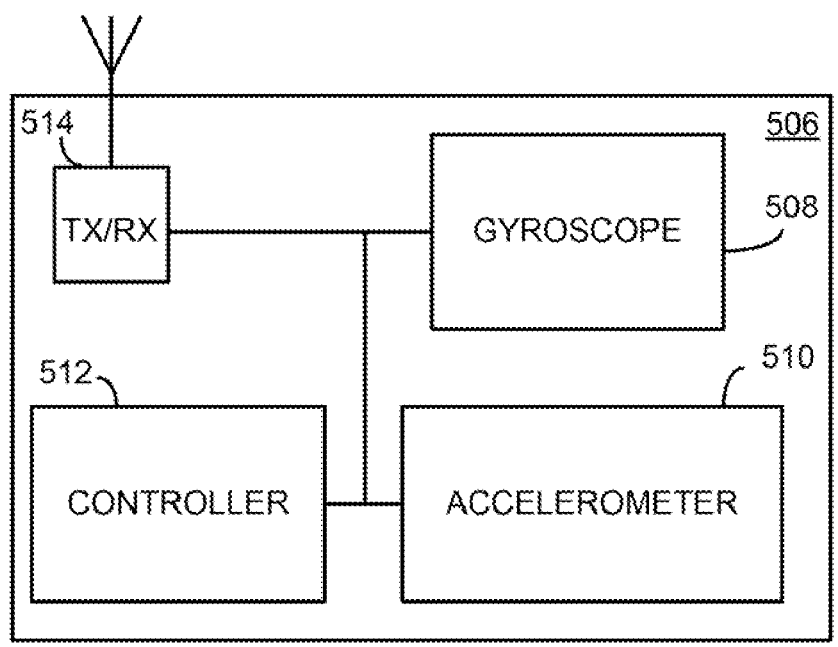

FIG. 5B is a block diagram of the components of the lifting monitoring system 500 of FIG. 5A. For illustrative purposes, it will be assumed that the portable computing device 406 functionality of FIG. 4 is incorporated into the trunk sensor 504 or FIG. 5. Thus, the trunk sensor 504 includes, in addition to a gyroscope 508, accelerometer 510, controller 512, and transceiver 514, as included in trunk sensor 404, trunk sensor 504 also includes a processor 516, memory 518, a removable storage device 520, a feedback device 522, and optionally a digital signal processor 524. Each of these components carries out substantially the same functionality as the corresponding components depicted in the lift monitoring system 400. However, to maintain a relatively small form factor, the feedback device 522 of the lift monitoring system 500 is preferably limited to an audio device, vibrating device, or light emitting diode.

As with the lift monitoring system 400, alternative implementations of the lift monitoring system 500 may be utilized employing additional or fewer sensors without departing from the scope of the invention. In addition, in a further alternative embodiment, instead of the processing functionality being incorporated into one of the sensor platforms as described in FIGS. 5A and 5B, one of the sensing platforms may be incorporated into a portable computing device. For example, the accelerometers currently used in certain devices, such as the IPHONE, provided by Apple Inc. or the BLACKBERRY STORM provided by Research in Motion, Inc. may be used to replace one of the sensor platforms in the system.

Figure 7:
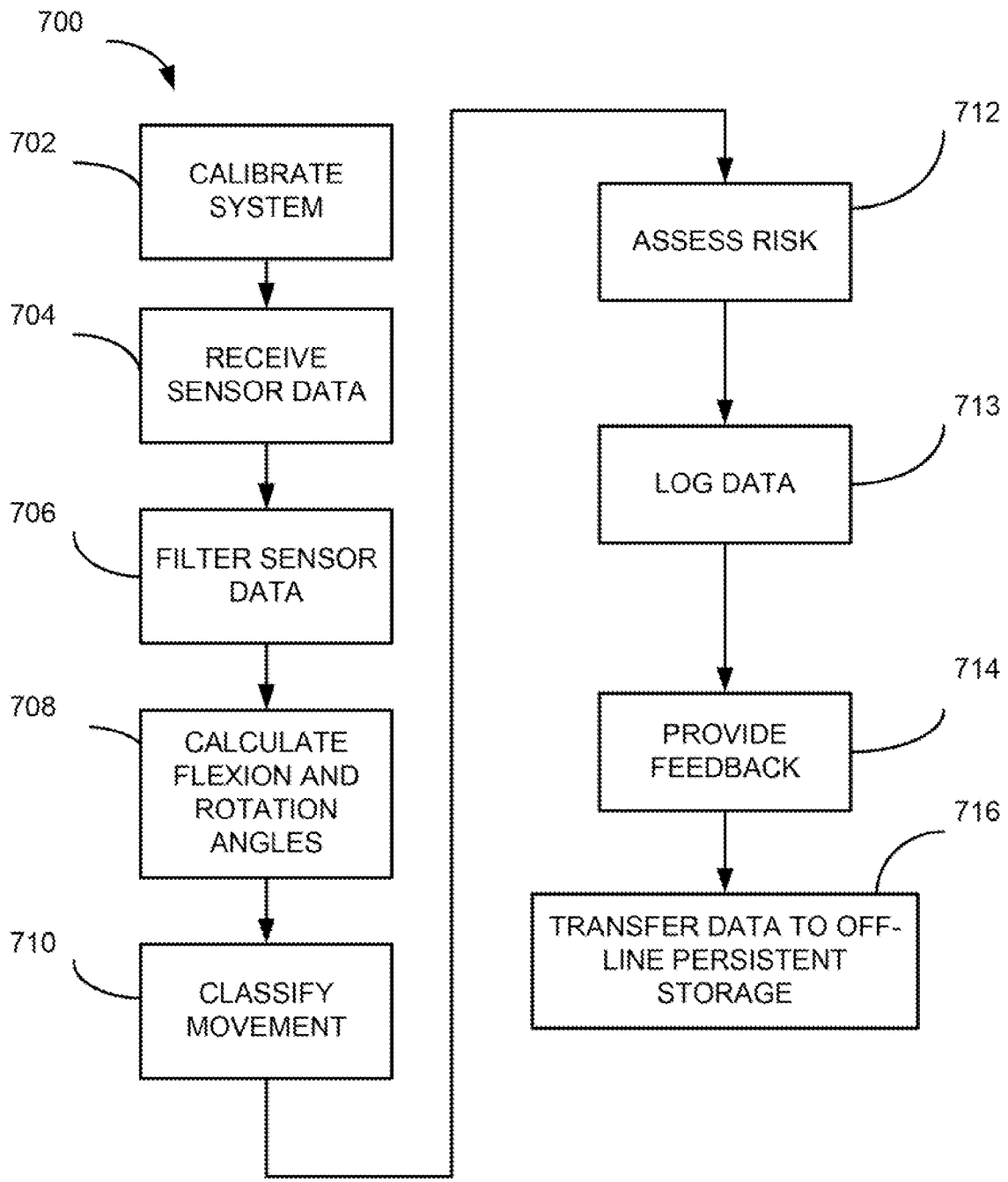
FIG. 7 is a flow chart of a method of monitoring the lifting behavior of a subject, according to an illustrative embodiment of the invention.

FIG. 7 is a flow chart of a method 700 of monitoring the lifting behavior of a subject, as carried out by the portable computing device 408 of the lift monitoring system 400 of FIG. 4. At a high level, the method includes calibrating the system (step 702), receiving sensor data (step 704), filtering the sensor data (step 706), and calculating movement parameters (step 708) based on the sensor data. The movement parameters are then processed to classify the movement (step 710) and assess the risk associated with the movement (step 712). Feedback is then provided (step 714) and data is off-loaded to off-line persistent storage (step 716) for further analysis.

The method begins with a calibration process (step 702). In the calibration phase, the wearer of the lift monitoring system 400 dons the trunk sensor 404, the thigh sensor 406, and the portable computing device 408. The wearer then powers on the sensors 404 and 406, initiates wireless links between the portable computing device 408 and the sensors 404 and 406, and activates data collection. The communication link initiation and activation can be carried out via a graphical user interface on the portable computing device 408. The graphical user interface is generated by the execution by the processor 432 of computer readable instructions stored on a computer readable medium on or coupled to the portable computing device 408.

After data collection is activated, for a predetermined period of time, preferably on the order of about 5 seconds, the wearer remains relatively still in a fully upright position. This allows the portable computing device 408 to receive sufficient data from the sensors 404 and 406 to determine baseline acceleration and rotation values (i.e., the Baseline and Equilibrium values described above). In one embodiment, the portable computing device 408 uses an average of the values collected during this time period as the baseline values.

In alternative embodiments, additional steps are taken in calibrating the lift monitoring system. For example, in one embodiment, additional characteristics of the user are entered into the portable computing device, including for example, height, arm length, torso length, leg length, individual flexibility thresholds, object weight limits, etc., which may be used to fine tune the classification and risk assessment processes. Similarly, environmental information, including for example, temperature and initial object height information (e.g., the height of a conveyor belt) may also be entered.

After the portable computing device is calibrated (step 702), the wearer may begin his or her routine activities, including lifting objects. While the wearer is carrying out such activities, the portable computing device 408 receives acceleration and rotation data from the sensors 404 and 406 (step 704) in real-time in the form of digital voltage values output by the accelerometers 422 and gyroscopes 420 incorporated therein. Before analyzing the acceleration and rotation data, the portable computing device applies a band-pass or low-pass filter (step 706) to the received data to reduce noise. In one implementation, the portable computing device applies an 8th order Finite Impulse Response filter with a sampling rate of about 32.5 Hz. Preferably, the data is filtered using the Hamming-window method using a cut-off frequency of about 1-5 Hz. Increasing the sample rate or the order of the filter may provide additional accuracy at the expense of increased processing load. Use of two high a sampling rate or using too high an order filter has proven to cause system drop outs. Extensive experimentation of prototype systems identified that a sampling rate of about 32.5 Hz with an eighth order filter yields useful results with adequate processing performance.

Using the filtered data derived in step 704, the portable computing device 408 calculates a trunk angle, a thigh angle, and a trunk rotation angle (i.e., rotation of trunk with respect to the lower body in the transverse plane (step 708). Suitable processes for calculating the angles are described above in relation to FIG. 4B. Based on the calculated angles, the portable computing device 408 classifies the movement (step 710) and then assesses the risk posed by the movement (step 712) as described above. The raw data along with the classification and assessment of risk are then logged in a database maintained in the memory 436 (step 713). The data is stored along with a timestamp. In one embodiment, the filtered sensor data from the each sensor is stored in separate sets of log files. The classification and assessment data are stored in a third set of log files. The data log files store in following format:

Timestamp+channel 1 data+channel 2 data+ . . . + channel $N$ data, where each channel corresponds to an output value received from the sensors. The number of channels depends on the particular sensor platform selected for use. The IMU6, for example, can output as many as 13 channels including the accelerometer, gyroscope, and temperature sensor data described above. In one embodiment, the portable computing device only stores data for channels used in the movement classification and risk assessment processes. In another embodiment, additional channels of data are logged for additional offline analysis. The classification and assessment data are stored in an event file in the following format:

Timestamp+Classification+Risk Assessment, wherein the Classification and Risk Assessments are represented by integer values. The portable computing device starts a new log file when the size of previous log file reaches 10 Megabytes.

The portable computing device 408 then outputs feedback to the subject 402 (step 714). In one embodiment, the portable computing device 408 provide continuous feedback including the current thing angle, trunk angle, and trunk rotation values. Alternatively, the portable computing device 408 only provides feedback upon detecting movement posing an increased risk of injury. In one embodiment, the portable computing device 408 also provides positive feedback. For example, if a lifter improves his or her lifting technique an audio or visual message, e.g., "That's better!" or "Good lift!" may be presented to the lifter.

After the subject 402 completes his or her activities, the log files are transferred to a remote computing device, such as business logic processor 119 of FIG. 1 or local server 310 of FIG. 3, for further analysis (step 716). The log files may be transferred via one of the transceivers 430*a* or 430*b* of the portable computing device 408, via the data port 438, or by transferring the files to a removable storage medium inserted into the removable storage device 440 and ejecting the storage medium. In an alternative embodiment, the portable computing device 408 merely receives, filters, and stores the sensor data for batch processing by the remote computer.

Although the present invention has been particularly shown and described above with reference to illustrative embodiments, alterations and modifications thereof may become apparent to those skilled in the art. It is therefore intended that the following claims cover all such alterations and modifications as fall within the true spirit and scope of the present invention.

What is claimed is:

1. A system for monitoring the lifting behavior of a subject comprising:
   a wearable trunk sensor to be worn by the subject for measuring movement of a trunk of the subject and for outputting trunk sensor data indicative of measured trunk movement;
   a wearable thigh sensor to be worn by the subject for measuring movement of a thigh of the subject and for outputting thigh sensor data indicative of measured thigh movement;
   a computing device in communication with the trunk sensor and the thigh sensor configured for:
   receiving the output trunk sensor data;
   receiving the output thigh sensor data;
   determining a trunk angle based on the received trunk sensor data;
   determining a thigh angle based on the received thigh sensor data;
   classifying subject movements as corresponding to one or more predetermined lifting strategies based on the determined trunk angle and thigh angle;
   calculating a lift risk level associated with subject movements based on the determined trunk angle and thigh angles; and
   outputting feedback indicative of at least one of i) a determination that the subject is employing an unsafe lifting strategy and ii) an incidence of a high-risk movement.

2. The system of claim 1, wherein the computing device outputs the feedback to the subject.

3. The system of claim 1, comprising an insurance business logic processor configured for receiving the feedback output by the computing device and for adjusting a parameter of an insurance policy based on the received feedback.

4. The system of claim 3, wherein the feedback received by the insurance business logic processor excludes any personally identifiable information associated with the subject.

5. The system of claim 1, wherein the feedback output by the computing device comprises exception data.

6. The system of claim 1, wherein the computing device is further configured to convert the determined trunk angle and the determined thigh angle into a trunk flexion value and a knee flexion value.

7. The system of claim 1, wherein the risk level calculation is further based on at least one of a weight of an object lifted by the subject, a horizontal distance the subject carries a lifted object, the vertical height the subject lifts an object, the stability of the object being lifted, locomotion data, ambient temperature, a slope of the ground upon which the subject lifts an object, a frequency with which the subject lifts objects, and the rate with which the subject lifts objects.

8. The system of claim 1, wherein:
   the trunk sensor comprises an accelerometer,
   the thigh sensor comprises an accelerometer,
   the computing device determines the trunk angle based on acceleration data output by the trunk sensor; and
   the computing device determines the thigh angle based on acceleration data output by the thigh sensor.

9. The system of claim 8, wherein the accelerometers in the thigh sensor and trunk sensor measure acceleration in at least two dimensions.

10. The system of claim 1, wherein the trunk sensor and thigh sensor each comprises an accelerometer and a gyroscope.

11. The system of claim 10, wherein the computing device determines the trunk angle based on acceleration and rotation data output by the trunk sensor and the thigh angle based on acceleration and rotation data output by the thigh sensor.

12. The system of claim 11, wherein for at least one of the thigh angle determination and the trunk angle determination, the computing device utilizes received acceleration data to correct for gyroscopic drift in received rotation data and wherein the angle determination is based on drift-corrected rotation data.

13. The system of claim 10, wherein the computing device is configured to calculate torso rotation of the subject by comparing the rotation data output by the trunk sensor with rotation data output by the thigh sensor.

14. The system of claim 1, wherein the risk level calculation is based in part on the lifting strategy employed by the subject.

15. The system of claim 1, wherein the risk level calculation is based in part on predetermined movement thresholds.

16. The system of claim 1, comprising a weight sensor in communication with the computing device for determining a weight of an object lifted by the subject and wherein the risk level calculation is further based on the determined object weight.

17. The system of claim 16, wherein the weight sensor comprises a pressure sensor for wirelessly transmitting pressure data to the computing device.

18. The system of claim 17, wherein the pressure sensor is configured for wearing within a shoe of the subject.

19. The system of claim 17, wherein the pressure sensor is configured for standing on by the subject.

20. The system of claim 17, wherein the pressure sensor is configured for measuring a distribution of weight the subject applies to the subject's feet during a lift.

21. The system of claim 16, wherein the weight sensor comprises an RFID reader for interrogating RFID tags coupled to lifted objects and for extracting weight information from data retrieved from interrogated RFID tags.

22. The system of claim 1, wherein at least one of the thigh sensor and trunk sensor comprise a wireless transceiver configured for communication with the computing device according to the BLUETOOTH protocol.

23. The system of claim 1, wherein at least one of the thigh sensor and trunk sensor comprise a wireless transceiver configured for communication with the computing device according to one of the ANT, ANT+, and ZIGBEE protocols.

24. The system of claim 1, wherein the computing device and one of the thigh sensor and the trunk sensor share a common housing.

25. The system of claim 1, wherein the predetermined lifting strategies include stoop lifts and squat lifts.

26. The system of claim 25, wherein the predetermined lifting strategies further include a semi-squat lift.

27. The system of claim 1, wherein the predetermined lifting strategies include strategies that incorporate torso rotation.

28. The system of claim 1, wherein the computing device in communication with the trunk sensor and thigh sensor comprises a portable computing device.

29. A computerized method for monitoring the lifting behavior of a subject comprising:
receiving, from a wearable trunk sensor worn by the subject, trunk sensor data indicative of trunk movement measured by the trunk sensor;
receiving by a transceiver, from a wearable thigh sensor worn by the subject, thigh sensor data indicative of thigh movement measured by the thigh sensor;
determining, by a portable computing device, a trunk angle based on the received trunk sensor data;
determining, by the portable computing device, a thigh angle based on the received thigh sensor data;
calculating, by the portable computing device, a lift risk level associated with subject movements based on the determined trunk angle and thigh angle,
outputting, by the portable computing device, feedback indicative of an incidence of a high-risk movement.

30. The computerized method of claim 29, wherein the portable computing device outputs the feedback to the subject.

31. The computerized method of claim 29, comprising:
receiving, by an insurance business logic processor, the feedback output by the portable computing device; and
adjusting, by the insurance business logic processor, a parameter of an insurance policy based on the received feedback.

32. The computerized method of claim 31, wherein the feedback received by the insurance business logic processor excludes any personally identifiable information associated with the subject.

33. The computerized method of claim 29, wherein the feedback output by the portable computing device comprises exception data.

34. The computerized method of claim 29, comprising converting, by the portable computer device, the determined trunk angle and the determined thigh angle into a trunk flexion value and a knee flexion value.

35. The computerized method of claim 29, wherein the risk level calculation is further based on at least one of a weight of an object lifted by the subject, a horizontal distance the subject carries a lifted object, the vertical height the subject lifts an object, the stability of the object being lifted, locomotion data, ambient temperature, a slope of the ground upon which the subject lifts an object, a frequency with which the subject lifts objects, and the rate with which the subject lifts objects.

36. The computerized method of claim 29, comprising classifying, by the portable computing device, subject movements as corresponding to one or more predetermined lifting strategies, and wherein the output feedback includes a determination that the subject is employing an unsafe lifting strategy.

37. The method of claim 29, wherein:
the trunk sensor data comprises data indicative of trunk acceleration in at least two dimensions,
the thigh sensor data comprises data indicative of thigh acceleration in at least two dimensions,
the portable computing device determines the trunk angle based on the trunk acceleration data; and
the portable computing device determines the thigh angle based on the thigh acceleration data.

38. The computerized method of claim 29, wherein:
the trunk sensor data comprises data indicative of trunk acceleration and torso rotation;
the thigh sensor data comprises data indicative of thigh acceleration and thigh rotation;
determining the trunk angle comprises determining the trunk angle based at least in part on trunk acceleration data and torso rotation data; and
determining the thigh angle comprises determining the thigh angle based at least in part on thigh acceleration data and thigh rotation data.

39. The computerized method of claim 38, wherein determining at least one of the thigh angle determination and the trunk angle comprises utilizing received acceleration data to correct for gyroscopic drift in received rotation data and determining the angle based on drift-corrected rotation data.

40. The computerized method of claim 38, comprising calculating torso rotation of the subject by comparing rotation data received from the trunk sensor with rotation data received from the thigh sensor.

41. The computerized method of claim 29, wherein the risk level calculation is based in part on one of a lifting strategy employed by the subject and predetermined movement thresholds.

42. The computerized method of claim 29, comprising receiving, by the portable computing device, object weight data indicative of the weight of an object being lifted from a weight sensor, and wherein calculating the risk level is further based on the weight of the object as indicated by the received object weight data.

43. The computerized method of claim 42, wherein the object weight data comprises pressure data received from one of a sensor coupled to a shoe worn by the subject and a sensor coupled to a floor on which the subject is standing.

44. The computerized method of claim 43, wherein the pressure data is indicative of a distribution of weight the subject applies to the subject's feet during a lift.

45. The computerized method of claim 42, wherein receiving object weight data comprises interrogating an RFID tag coupled to an object being lifted by the subject and extracting object weight data from data received resulting from the interrogation.

46. The computerized method of claim 29, wherein at least one of the thigh sensor data and the trunk sensor data are received from at least one of the thigh sensor and the trunk sensor via a wireless transceiver configured for communication according to one of the BLUETOOTH, ANT, ANT+, and ZIGBEE protocols.

47. The computerized method of claim 29, wherein at least one of the thigh sensor and the trunk sensor share a common housing with the portable computing device.

48. The computerized method of claim 29, comprising classifying subject movements as corresponding to one or more predetermined lifting strategies based at least on the determined trunk angle and thigh angle, wherein the predetermined lifting strategies include at least stoop lifts, squat lifts, semi-squat lifts, and lifts including torso rotation.

49. The computerized method of claim 48, wherein the lift risk level associated with subject movements is further based on the lifting strategy employed by the subject.

50. A non transitory computer readable medium storing computer executable instructions, which, when executed, cause a portable computing device to:
receive by a transceiver, from a wearable trunk sensor worn by a subject, trunk sensor data indicative of trunk movement measured by the trunk sensor;
receive by a transceiver, from a wearable thigh sensor worn by the subject, thigh sensor data indicative of thigh movement measured by the thigh sensor;
determine a trunk angle based on the received trunk sensor data;
determine a thigh angle based on the received thigh sensor data;
calculate a lift risk level associated with subject movements based on the determined trunk angle and thigh angle,
classify subject movements as corresponding to one or more predetermined lifting strategies; and
output feedback to the subject indicative of at least one of i) a determination that the subject is employing an unsafe lifting strategy and ii) an incidence of a high-risk movement.

51. The non-transitory computer readable medium of claim 50, wherein the computer executable instructions cause the portable computing device to output the feedback to at least one of the subject and an insurance business logic processor configured for adjusting a parameter of an insurance policy based on the received feedback.

52. The non-transitory computer readable medium of claim 51, wherein the feedback output to the insurance business logic processor excludes any personally identifiable information associated with the subject.

53. The non-transitory computer readable medium of claim 50, wherein the feedback output by the portable computing device comprises exception data.

54. The non-transitory computer readable medium of claim 50, storing instructions, which when executed by the processor, cause the portable computing device to convert the determined trunk angle and the determined thigh angle into a trunk flexion value and a knee flexion value.

55. The non-transitory computer readable medium of claim 50, wherein the risk level calculation is further based on at least one of a weight of an object lifted by the subject, a horizontal distance the subject carries a lifted object, the vertical height the subject lifts an object, the stability of the object being lifted, locomotion data, ambient temperature, a slope of the ground upon which the subject lifts an object, a frequency with which the subject lifts objects, and the rate with which the subject lifts objects.

56. The non-transitory computer readable medium of claim 50, wherein
the trunk sensor data comprises data indicative of trunk acceleration in at least two dimensions,
the thigh sensor data comprises data indicative of thigh acceleration in at least two dimensions,
the portable computing device determines the trunk angle based on the trunk acceleration data; and
the portable computing device determines the thigh angle based on the thigh acceleration data.

57. The non-transitory computer readable medium of claim 50, wherein:
the trunk sensor data comprises data indicative of trunk acceleration and torso rotation; and
the thigh sensor data comprises data indicative of thigh acceleration and thigh rotation;
wherein determining the trunk angle comprises determining the trunk angle based at least in part on trunk acceleration data and torso rotation data, and determining the thigh angle comprises determining the thigh angle based at least in part on thigh acceleration data and thigh rotation data.

58. The non-transitory computer readable medium of claim 57, wherein determining at least one of the thigh angle determination and the trunk angle comprises utilizing received acceleration data to correct for gyroscopic drift in received rotation data and determining the angle based on drift-corrected rotation data.

59. The non-transitory computer readable medium of claim 57, storing instructions, which when executed by the processor, cause the portable computing device to calculate torso rotation of the subject by comparing rotation data received from the trunk sensor with rotation data received from the thigh sensor.

60. The non-transitory computer readable medium of claim 50, wherein the risk level calculation is based in part on at least one of the lifting strategy employed by the subject and on predetermined movement thresholds.

61. The non-transitory computer readable medium of claim 50, storing instructions, which when executed by the processor, cause the portable computing device to receive object weight data indicative of the weight of an object being lifted from a weight sensor, and wherein calculating the risk level is further based on the weight of the object as indicated by the received object weight data.

62. The non-transitory computer readable medium of claim 61, wherein the object weight data comprises pressure data received from one of a sensor coupled to a shoe worn by the subject and a sensor coupled to a floor on which the subject is standing.

63. The non-transitory computer readable medium of claim 62, wherein the pressure data is indicative of a distribution of weight the subject applies to the subject's feet during a lift.

64. The non-transitory computer readable medium of claim 61, wherein receiving object weight data comprises interrogating an RFID tag coupled to an object being lifted by the subject and extracting object weight data from data received resulting from the interrogation.

65. The non-transitory computer readable medium of claim 50, wherein at least one of the thigh sensor data and the trunk sensor data are received from at least one of the thigh sensor and the trunk sensor via a wireless transceiver configured for communication according to the BLUETOOTH, ANT, ANT+, and ZIGBEE protocols.

66. The non-transitory computer readable medium of claim 50, wherein at least one of the thigh sensor and the trunk sensor share a common housing with the portable computing device.

67. The non-transitory computer readable medium of claim 50, wherein the predetermined lifting strategies include stoop lifts, squat lifts, semi-squat lifts, and lifts including torso rotation.

68. A system for monitoring the lifting behavior of a subject comprising:
  means for receiving, from a wearable trunk sensor worn by the subject, trunk sensor data indicative of trunk movement measured by the trunk sensor;
  means for receiving, from a wearable thigh sensor worn by the subject, thigh sensor data indicative of thigh movement measured by the thigh sensor;
  means for determining, by a portable computing device, a trunk angle based on the received trunk sensor data;
  means for determining, by the portable computing device, a thigh angle based on the received thigh sensor data;
  means for calculating, by the portable computing device, a lift risk level associated with subject movements based on the determined trunk angle and thigh angle,
  means for classifying, by the portable computing device, subject movements as corresponding to one or more predetermined lifting strategies; and
  means for outputting, by the portable computing device, feedback to the subject indicative of at least one of i) a determination that the subject is employing an unsafe lifting strategy and ii) an incidence of a high-risk movement.

69. The system of claim 68, comprising:
  means for receiving, by an insurance business logic processor, the feedback output by the portable computing device; and
  means for adjusting, by the insurance business logic processor, a parameter of an insurance policy based on the received feedback.

70. The system of claim 69, wherein the feedback received by the insurance business logic processor excludes any personally identifiable information associated with the subject.

71. The system of claim 68, wherein the feedback output by the portable computing device comprises exception data.

72. The system of claim 68, comprising means for converting, by the portable computer device, the determined trunk angle and the determined thigh angle into a trunk flexion value and a knee flexion value.

73. The system of claim 68, wherein the risk level calculation is further based on at least one of a weight of an object lifted by the subject, a horizontal distance the subject carries a lifted object, the vertical height the subject lifts an object, the stability of the object being lifted, locomotion data, ambient temperature, a slope of the ground upon which the subject lifts an object, a frequency with which the subject lifts objects, and the rate with which the subject lifts objects.

74. The system of claim 68, wherein:
  the trunk sensor data comprises data indicative of trunk acceleration in at least two dimensions,
  the thigh sensor data comprises data indicative of thigh acceleration in at least two dimensions,
  the portable computing device determines the trunk angle based on the trunk acceleration data; and
  the portable computing device determines the thigh angle based on the thigh acceleration data.

75. The system of claim 68, wherein:
  the trunk sensor data comprises data indicative of trunk acceleration and torso rotation; and
  the thigh sensor data comprises data indicative of thigh acceleration and thigh rotation,
  wherein determining the trunk angle comprises determining the trunk angle based at least in part on trunk acceleration data and torso rotation data, and determining the thigh angle comprises determining the thigh angle based at least in part on thigh acceleration data and thigh rotation data.

76. The system of claim 75, wherein determining at least one of the thigh angle determination and the trunk angle comprises utilizing received acceleration data to correct for gyroscopic drift in received rotation data and determining the angle based on drift-corrected rotation data.

77. The system of claim 75, further comprising: calculating a torso rotation of the subject by comparing rotation data received from the trunk sensor with rotation data received from the thigh sensor.

78. The system of claim 68, wherein the risk level calculation is based in part on at least one of the lifting strategy employed by the subject and predetermined movement thresholds.

79. The system of claim 68, further comprising: receiving, by the portable computing device, object weight data indicative of the weight of an object being lifted from a weight sensor, and wherein calculating the risk level is further based on the weight of the object as indicated by the received object weight data.

80. The system of claim 79, wherein the object weight data comprises pressure data received from one of a sensor coupled to a shoe worn by the subject and a sensor coupled to a floor on which the subject is standing.

81. The system of claim 80, wherein the pressure data is indicative of a distribution of weight the subject applies to the subject's feet during a lift.

82. The system of claim 79, wherein receiving object weight data comprises interrogating an RFID tag coupled to an object being lifted by the subject and extracting object weight data from data received resulting from the interrogation.

83. The system of claim 68, wherein at least one of the thigh sensor data and the trunk sensor data are received from at least one of the thigh sensor and the trunk sensor via a wireless transceiver configured for communication according to one of the BLUETOOTH, ANT, ANT+, and ZIGBEE protocols.

84. The system of claim 68, wherein at least one of the thigh sensor and the trunk sensor and the portable computing device share a common housing.

85. The system of claim 68, wherein the predetermined lifting strategies include stoop lifts, squat lifts, semi-squat lifts, and lifts including torso rotation.

* * * * *